United States Patent
Chai et al.

(10) Patent No.: US 11,917,614 B2
(45) Date of Patent: Feb. 27, 2024

(54) UPLINK CONTROL INFORMATION TRANSMISSION METHOD AND APPARATUS

(71) Applicant: HUAWEI TECHNOLOGIES CO., LTD., Shenzhen (CN)

(72) Inventors: Xiaomeng Chai, Shanghai (CN); Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 17/487,312

(22) Filed: Sep. 28, 2021

(65) Prior Publication Data

US 2022/0015122 A1 Jan. 13, 2022

Related U.S. Application Data

(63) Continuation of application No. PCT/CN2020/081403, filed on Mar. 26, 2020.

(30) Foreign Application Priority Data

Mar. 29, 2019 (CN) .......................... 201910252445.1

(51) Int. Cl.
*H04W 72/1268* (2023.01)

(52) U.S. Cl.
CPC ... *H04W 72/1268* (2013.01); *H04W 74/0833* (2013.01)

(58) Field of Classification Search
CPC ....................... H04W 72/1268; H04W 74/0833
(Continued)

(56) References Cited

U.S. PATENT DOCUMENTS

2016/0381674 A1 12/2016 Kim et al.
2018/0279376 A1 9/2018 Dinan et al.
(Continued)

FOREIGN PATENT DOCUMENTS

CN 103858503 A 6/2014
CN 106982111 A 7/2017
(Continued)

OTHER PUBLICATIONS

NTT Docomo, Inc., UCI on PUSCH, 3GPP TSG RAN WG1 Meeting #90, Prague, Czechia, Aug. 21-25, 2017, R1-1713945, 7 pages.
(Continued)

*Primary Examiner* — Intekhaab A Siddiquee
(74) *Attorney, Agent, or Firm* — Maier & Maier, PLLC

(57) ABSTRACT

An uplink control information transmission method and apparatus. The method includes: determining, by a terminal device, a preamble that needs to be sent; determining, by the terminal device based on the preamble, a first resource set that is in a physical uplink shared channel resource and that is used to send uplink control information, where the PUSCH resource includes a plurality of resource sets; and sending, by the terminal device, the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

19 Claims, 17 Drawing Sheets

(58) Field of Classification Search
USPC .......................................................... 370/329
See application file for complete search history.

(56) References Cited

U.S. PATENT DOCUMENTS

| 2019/0053226 | A1* | 2/2019 | Xiong ....................... H04L 1/08 |
| 2019/0081737 | A1 | 3/2019 | Huang et al. |

FOREIGN PATENT DOCUMENTS

| CN | 107113147 A | 8/2017 |
| CN | 107371227 A | 11/2017 |
| CN | 107889248 A | 4/2018 |
| CN | 108024345 A | 5/2018 |
| CN | 108347757 A | 7/2018 |
| CN | 108633051 A | 10/2018 |
| IN | 108282874 A | 7/2018 |
| WO | 2013048114 A2 | 4/2013 |
| WO | 2015129985 A1 | 9/2015 |
| WO | 2017209417 A1 | 12/2017 |
| WO | 2018/094175 A1 | 5/2018 |
| WO | 2018175809 A1 | 9/2018 |

OTHER PUBLICATIONS

ZTE "Summary of 7.2.1.1 Channel Structure for Two-step RACH." 3GPP TSG RAN WG1 #96 R1-1903435. Athens, Greece. Feb. 25-Mar. 1, 2019. 28 pages.

3GPP. 3rd Generation Partnership Project; Technical Specification Group Radio Access Network; Study on New Radio (NR) Access Technology (Release 14). 3GPP TR 38.912 V1.0.0. Mar. 2017. 74 pages.

ZTE. "Email discussion on potential link-level simulation assumption for 2-step Rach." 3GPP TSG RAN WG1 #96, R1-1903834. Athens, Greece, Feb. 25-Mar. 1, 2019. 19 pages.

* cited by examiner

UPLINK CONTROL INFORMATION TRANSMISSION METHOD AND APPARATUS

CROSS-REFERENCE TO RELATED APPLICATIONS

This application is a continuation of International Application No. PCT/CN2020/081403, filed on Mar. 26, 2020, which claims priority to Chinese Patent Application No. 201910252445.1, filed on Mar. 29, 2019. The disclosures of the aforementioned applications are hereby incorporated by reference in their entireties.

TECHNICAL FIELD

The embodiments relate the communication field, and more specifically, to an uplink control information transmission method and apparatus in the communication field.

BACKGROUND

With rapid development of ultra-reliable low-latency (URLLC), machine type communication (MTC), and internet of things (IoT) in the future, data transmission that requires sparse packets, small packets, and low latency is also applied to increasing scenarios. To implement such data transmission, a two-step (2-step) random access channel (RACH) solution is proposed.

In the 2-step RACH solution, a network device sends configuration information of a physical uplink shared channel (PUSCH) resource by using a broadcast message. As a result, transmission parameters configured in each transmission for all users in a cell corresponding to the broadcast message are the same. For example, the transmission parameters, such as a modulation and coding scheme (MCS), a hybrid automatic repeat request (HARQ) process, a number of repetitions, and an initial transmission indication or a retransmission indication, cannot be changed. As a result, PUSCH transmission is inflexible.

To improve flexibility of PUSCH transmission, the network device may configure different transmission parameters for a user, and the user may send uplink control information (UCI), so that a transmission parameter selected by the user based on a requirement of the user is sent to the network device in the UCI. However, when a plurality of users transmit UCI on a same PUSCH resource, resources occupied by the UCI corresponding to the plurality of users also completely overlap. As a result, a success rate of UCI demodulation by the network device decreases.

SUMMARY

The embodiments provide an uplink control information transmission method and apparatus, to avoid a resource collision that occurs when a plurality of terminal devices transmit uplink control information, so that a success rate of uplink control information demodulation is increased.

According to a first aspect, an uplink control information transmission method is provided. The method includes: determining, by a terminal device, a preamble that needs to be sent; determining, by the terminal device based on the preamble, a first resource set that is in a physical uplink shared channel (PUSCH) resource and that is used to send uplink control information, where the PUSCH resource includes a plurality of resource sets, the plurality of resource sets include the first resource set, an intersection set of any two resource sets in the plurality of resource sets is an empty set, each resource set is corresponding to one preamble set, and an intersection set of preamble sets corresponding to any two resource sets is an empty set; and sending, by the terminal device, the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

In the embodiments, a resource set that is used by each of a plurality of terminal devices to send UCI of the terminal device and that is in the shared PUSCH resource may be determined by using the preamble, and an intersection set between any two resource sets in the plurality of resource sets is an empty set. That is, the resource sets used by the plurality of terminal devices to transmit the UCI are orthogonal, so that time-frequency resource collision that occurs when different terminal devices transmit the UCI is avoided, thereby increasing a success rate of UCI demodulation.

It should be noted that the uplink control information transmission method in the embodiments may be applied to a 2-step RACH procedure, or may be applied to grant-free transmission. In the grant-free transmission, a terminal device may determine a DMRS port, and determine, based on the DMRS port, a first resource set for sending uplink control information. In the 2-step RACH procedure, a terminal device may also determine, based on a DMRS port, a first resource set for sending uplink control information.

In a possible implementation, an uplink control information transmission method includes: determining, by a terminal device, a DMRS port; determining, by the terminal device based on the DMRS port, a first resource set that is in a PUSCH resource and that is used to send uplink control information, where the PUSCH resource includes a plurality of resource sets, the plurality of resource sets include the first resource set, an intersection set of any two resource sets in the plurality of resource sets is an empty set, each resource set is corresponding to one DMRS port set, and an intersection set of DMRS port sets corresponding to any two resource sets is an empty set; and sending, by the terminal device, the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

For example, in grant-free transmission, a plurality of terminal devices may share one PUSCH resource for communication. Each terminal device may determine a DMRS port number, and determine, based on the DMRS port, a first resource set that is in the PUSCH resource and that is used to send uplink control information.

For example, the terminal device may determine a DMRS port number, and determine, based on the DMRS port number, the first resource set used to send the uplink control information.

With reference to the first aspect, in some implementations of the first aspect, the determining, by the terminal device based on the preamble, a first resource set that is in a PUSCH resource and that is used to send uplink control information includes: determining, by the terminal device, the first resource set based on an index of the preamble.

With reference to the first aspect, in some implementations of the first aspect, the method further includes: receiving configuration information from an access network device, where the configuration information includes at least one of the following information: information used to determine a number of resource sets included in the physical uplink shared channel resource, and information used to determine a resource size required by each resource set.

For example, at least one terminal device in a same cell may receive a broadcast message sent by the access network device, where the broadcast message carries at least one of the following information: information used to indicate a PUSCH resource used by the at least one terminal device to communicate with the access network device, information used to determine a number of resources that are reserved in the PUSCH resource and that can be used to carry UCI, and information used to determine a number of REs that are in the PUSCH resource and that are occupied by each resource in a plurality of resources used to carry the UCI.

With reference to the first aspect, in some implementations of the first aspect, resources occupied by the plurality of resource sets in the PUSCH resource are consecutive in frequency domain.

For example, the PUSCH resource includes at least two resource sets used to carry the UCI. In an implementation, locations of REs included in each of the at least two resource sets in the PUSCH may be determined according to the following mapping method: Starting from a first symbol to which no DMRS is mapped, resource elements REs in the at least two resource sets are mapped to the PUSCH resource at a granularity of RE and in ascending order of RE numbers and first in frequency domain and then in time domain, where the first symbol to which no DMRS is mapped is the first symbol to which no DMRS is mapped and that is in the PUSCH resource, or the first symbol to which no DMRS is mapped after a DMRS symbol is mapped and that is in the PUSCH resource. Therefore, the REs in the at least two resource sets are distributed, at a granularity of RE and in ascending order of RE numbers and first in frequency domain and then in time domain, in resource locations that start from the first symbol to which no DMRS is mapped and that are in the PUSCH resource.

In a possible implementation, REs in the plurality of resource sets may be consecutively mapped to a frequency domain resource based on an order of indexes of preambles (or an order of indexes of preamble sets). For example, the order may be an ascending order of indexes, a descending order of indexes, or a preset order of indexes.

In a possible implementation, REs in the plurality of resource sets may be alternately and consecutively mapped to a frequency domain resource based on an order of indexes of preambles (or an order of indexes of preamble sets).

With reference to the first aspect, in some implementations of the first aspect, resources occupied by the plurality of resource sets in the PUSCH resource may be inconsecutive in frequency domain.

For example, a manner of mapping at least two pieces of UCI on the PUSCH resource includes: if a number of REs that are not used and that can be used on the $i^{th}$ symbol to carry the UCI is less than or equal to a number of REs required by a remaining unmapped part of the at least two pieces of uplink control information, the at least two pieces of uplink control information are consecutively mapped to the $i^{th}$ symbol at a granularity of RE; and if the number of REs that are not used and that can be used on the $i^{th}$ symbol to carry the UCI is greater than the number of REs required by the remaining unmapped part of the at least two pieces of uplink control information, the at least two pieces of uplink control information are inconsecutively mapped to the $i^{th}$ symbol at a granularity of RE, where the $i^{th}$ symbol starts from the first symbol to which no DMRS is mapped and is less than or equal to a largest symbol in the uplink shared resource set, and i is a positive integer.

It should be understood that the at least two pieces of uplink control information may be mapped first in frequency domain and then in time domain and in ascending order of the symbol i increased by 1 each time, until all of the at least two pieces of uplink control information are mapped.

In a possible implementation, REs in the plurality of resource sets may be inconsecutively mapped to a frequency domain resource based on an order of indexes of preambles (or an order of indexes of preamble sets).

For example, the order may be an ascending order of indexes, a descending order of indexes, or a preset order of indexes.

In a possible implementation, REs in the plurality of resource sets may be alternately and inconsecutively mapped to a frequency domain resource based on an order of indexes of preambles.

With reference to the first aspect, in some implementations of the first aspect, there is a time-domain guard period and/or a frequency-domain guard band between any two resource sets in the plurality of resource sets.

With reference to the first aspect, in some implementations of the first aspect, there is a time-domain guard period and/or a frequency-domain guard band between an RE in any resource set in the plurality of resource sets and an RE that is in the PUSCH resource and that is used to carry the uplink data.

With reference to the first aspect, in some implementations of the first aspect, the configuration information further includes a number of repetitions of the uplink control information.

In the embodiments, the UCI may be repeatedly transmitted on the PUSCH resource for a plurality of times, and the configuration information sent by the access network device may include the number of repetitions of the UCI, so that flexibility of transmitting the UCI on the PUSCH resource is improved, and a success rate of UCI demodulation is increased.

In a possible implementation, the number of repetitions of the UCI on the PUSCH resource may be associated with a preamble or DMRS port.

For example, preambles or DMRS ports may be grouped, and groups of preambles or DMRS ports may be corresponding to different quantities of repetitions of the UCI.

With reference to the first aspect, in some implementations of the first aspect, a size of the first resource set is related to the number of repetitions of the uplink control information.

With reference to the first aspect, in some implementations of the first aspect, the first resource set includes a plurality of resource subsets used to repeatedly transmit the uplink control information, and each resource subset is used to repeatedly transmit the uplink control information once.

With reference to the first aspect, in some implementations of the first aspect, at least two resource subsets in the plurality of resource subsets are located in different frequency bands.

With reference to the first aspect, in some implementations of the first aspect, the uplink control information includes at least one of the following:

a modulation and coding scheme, a number of repetitions, a new data indicator, a HARQ process, a redundancy version, indication information of a physical uplink shared channel resource, a scrambling ID, and a reference signal configuration.

The modulation and coding scheme is used to indicate a modulation and coding scheme corresponding to the uplink data corresponding to the uplink control information. The number of repetitions is used to indicate a number of times of retransmission of the data and/or the preamble during one transmission. The new data indicator is used to indicate first transmission of new data or indicate retransmission of the data. The HARQ process is used to indicate an index of a HARQ process that is in at least one HARQ process and in which the data is transmitted. The redundancy version is used to indicate a redundancy version that is in at least one redundancy version and that is used for transmitting the data. The indication information of the PUSCH resource is used to indicate a size and/or location information of a PUSCH resource used for current transmission. The scrambling ID is used to indicate a scrambling ID for transmission of the data and/or a scrambling ID of a DMRS associated with a PUSCH carrying the data. The reference signal configuration is used to indicate configuration information for transmission of a reference signal corresponding to an uplink reference signal, and the reference signal includes a channel sounding reference signal (SRS) and a DMRS associated with the PUSCH carrying the data.

Optionally, at least one format of at least one piece of UCI information transmitted on a same PUSCH resource may be the same, or may be different.

Further, a type and/or size of information included in the uplink control information may have an association relationship with the preamble or DMRS port.

In other words, different preambles or DMRS ports may be corresponding to different UCI formats. A UCI format corresponding to one preamble or DMRS port may be predefined, or may be configured by the access network device. That is, the access network device may configure a UCI format corresponding to each preamble or DMRS port. When receiving the UCI, the access network device may determine, based on a correspondence between a preamble and a UCI format or a correspondence between a DMRS port and a UCI format, a UCI format corresponding to a preamble or DMRS by detecting the preamble or DMRS.

It should be understood that the UCI format may refer to the type and/or size of the information carried in the UCI.

In a possible implementation, the terminal device sends the uplink data on a first data resource set, the PUSCH resource includes the first data resource set, and the first data resource set is a resource that is in the PUSCH resource and that is other than the plurality of resource sets and a resource set carrying a DMRS.

In a possible implementation, the terminal device sends the uplink data on a second data resource set, the PUSCH resource includes the second data resource set, the second data resource set is a resource determined based on the first resource set and PUSCH time-frequency resource indication information, and the uplink control information includes the PUSCH time-frequency resource indication information.

For example, the PUSCH time-frequency resource indication information may be used to indicate a size and a location of a PUSCH resource used for current transmission. The current transmission may be uplink transmission used to transmit the uplink control information and the uplink data.

In a possible implementation, each resource set includes a time-frequency resource and a code domain resource. Time-frequency resources of the plurality of resource sets are the same, but code domain resources corresponding to the resource sets are different.

For example, different resource sets (UCI resource) on a same PUSCH resource may use a same time-frequency resource, namely, a same RE, and the UCI resources are distinguished by using different code domain resources. For example, different UCI resources use different code domain cyclic shifts, different orthogonal cover codes, or different spreading sequences. The code domain resource is associated with the preamble or DMRS port. For example, as long as the terminal device determines a preamble index or a DMRS port number (port index) that needs to be sent, a code domain resource corresponding to a UCI resource in a PUSCH resource corresponding to the preamble or the DMRS port may be determined.

According to a second aspect, an uplink control information receiving method is provided. The method includes: receiving, by an access network device, a preamble sent by a terminal device; determining, by the access network device based on the preamble, a first resource set that is in a PUSCH resource and that is used to receive uplink control information, where the PUSCH resource includes a plurality of resource sets, the plurality of resource sets include the first resource set, an intersection set of any two resource sets in the plurality of resource sets is an empty set, each resource set is corresponding to one preamble set, and an intersection set of preamble sets corresponding to any two resource sets is an empty set; and receiving, by the access network device, the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

In the embodiments, a resource set that is used by each of a plurality of terminal devices to receive UCI of the terminal device and that is in the shared PUSCH resource may be determined by using the preamble, and an intersection set between any two resource sets in the plurality of resource sets is an empty set. That is, the resource sets used by the plurality of terminal devices to transmit the UCI are orthogonal, so that time-frequency resource collision that occurs when different terminal devices transmit the UCI is avoided, thereby increasing a success rate of UCI demodulation.

It should be noted that the uplink control information transmission method in the embodiments may be applied to a 2-step RACH procedure, or may be applied to grant-free transmission. In the grant-free transmission, a terminal device may determine a DMRS port, and an access network device may determine, based on the DMRS port, a first resource set for receiving uplink control information. In the 2-step RACH procedure, a terminal device may also determine, based on a DMRS port, a first resource set for sending uplink control information.

In a possible implementation, an uplink control information transmission method includes: determining, by an access network device, a DMRS port selected by a terminal device; determining, by the access network device based on the DMRS port, a first resource set that is in a PUSCH resource and that is used to send uplink control information, where the PUSCH resource includes a plurality of resource sets, the plurality of resource sets include the first resource set, an intersection set of any two resource sets in the plurality of resource sets is an empty set, each resource set is corresponding to one DMRS port set, and an intersection set of DMRS port sets corresponding to any two resource sets is an empty set; and receiving, by the access network device, the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

For example, in grant-free transmission, a plurality of terminal devices may share one PUSCH resource block for communication. Each terminal device may determine a DMRS port, and determine, based on the DMRS port, a first resource set that is in the PUSCH resource and that is used to send uplink control information. That is, an access network device may determine, based on the port determined by the terminal device, a first resource set that is in the PUSCH resource and that is used to receive the uplink control information.

For example, the access network device may determine, based on a DMRS port number determined by the terminal device, the first resource set that is used to receive the uplink control information.

With reference to the second aspect, in some implementations of the second aspect, the determining, by the access network device based on the preamble, a first resource set that is in a PUSCH resource and that is used to receive uplink control information includes: determining, by the access network device, the first resource set based on an index of the preamble.

With reference to the second aspect, in some implementations of the second aspect, the method further includes: sending configuration information to the terminal device, where the configuration information includes at least one of the following information: information used to determine a number of resource sets included in the physical uplink shared channel resource, and information used to determine a resource size required by each resource set.

For example, the configuration information may be a broadcast message sent by the access network device, where the broadcast message carries at least one of the following information: information used to indicate a PUSCH resource used by at least one terminal device to communicate with the access network device, information used to determine a number of resources that are reserved in the PUSCH resource and that can be used to carry UCI, and information used to determine a number of REs that are in the PUSCH resource and that are occupied by each resource in a plurality of resources used to carry the UCI.

With reference to the second aspect, in some implementations of the second aspect, resources occupied by the plurality of resource sets in the PUSCH resource are consecutive in frequency domain.

For example, the PUSCH resource includes at least two resource sets used to carry the UCI. In an implementation, locations of REs included in each of the at least two resource sets in the PUSCH may be determined according to the following mapping method: Starting from a first symbol to which no DMRS is mapped, resource elements REs in the at least two resource sets are mapped to the PUSCH resource at a granularity of RE and in ascending order of RE numbers and first in frequency domain and then in time domain, where the first symbol to which no DMRS is mapped is the first symbol to which no DMRS is mapped and that is in the PUSCH resource, or the first symbol to which no DMRS is mapped after a DMRS symbol is mapped and that is in the PUSCH resource. Therefore, the REs in the at least two resource sets are distributed, at a granularity of RE and in ascending order of RE numbers and first in frequency domain and then in time domain, in resource locations that start from the first symbol to which no DMRS is mapped and that are in the PUSCH resource.

In a possible implementation, REs in the plurality of resource sets may be consecutively mapped to a frequency domain resource based on an order of indexes of preambles (or an order of indexes of preamble sets).

For example, the order may be an ascending order of indexes, a descending order of indexes, or a preset order of indexes.

In a possible implementation, REs in the plurality of resource sets may be alternately and consecutively mapped to a frequency domain resource based on an order of indexes of preambles (or an order of indexes of preamble sets).

With reference to the second aspect, in some implementations of the second aspect, resources occupied by the plurality of resource sets in the PUSCH resource are inconsecutive in frequency domain.

For example, a manner of mapping at least two pieces of UCI on the PUSCH resource includes: If a number of REs that are not used and that can be used on the $i^{th}$ symbol to carry the UCI is less than or equal to a number of REs required by a remaining unmapped part of the at least two pieces of uplink control information, the at least two pieces of uplink control information are consecutively mapped to the $i^{th}$ symbol at a granularity of RE; and if the number of REs that are not used and that can be used on the $i^{th}$ symbol to carry the UCI is greater than the number of REs required by the remaining unmapped part of the at least two pieces of uplink control information, the at least two pieces of uplink control information are inconsecutively mapped to the $i^{th}$ symbol at a granularity of RE, where the $i^{th}$ symbol starts from the first symbol to which no DMRS is mapped and is less than or equal to a largest symbol in the uplink shared resource set, and i is a positive integer.

It should be understood that the at least two pieces of uplink control information may be mapped first in frequency domain and then in time domain and in ascending order of the symbol i increased by 1 each time, until all of the at least two pieces of uplink control information are mapped.

In a possible implementation, REs in the plurality of resource sets may be inconsecutively mapped to a frequency domain resource based on an order of indexes of preambles (or an order of indexes of preamble sets).

For example, the order may be an ascending order of indexes, a descending order of indexes, or a preset order of indexes.

In a possible implementation, REs in the plurality of resource sets may be alternately and inconsecutively mapped to a frequency domain resource based on an order of indexes of preambles.

With reference to the second aspect, in some implementations of the second aspect, there is a time-domain guard period and/or a frequency-domain guard band between any two resource sets in the plurality of resource sets.

With reference to the second aspect, in some implementations of the second aspect, there is a time-domain guard period and/or a frequency-domain guard band between an RE in any resource set in the plurality of resource sets and an RE that is in the PUSCH resource and that is used to carry the uplink data.

With reference to the second aspect, in some implementations of the second aspect, the configuration information further includes a number of repetitions of the uplink control information.

In the embodiments, the UCI may be repeatedly transmitted on the PUSCH resource for a plurality of times, and the configuration information sent by the access network device may include the number of repetitions of the UCI corresponding to the terminal device, so that flexibility of transmitting the UCI on the PUSCH resource is improved, and a success rate of UCI demodulation is increased.

In a possible implementation, the number of repetitions of the UCI on the PUSCH resource may be associated with a preamble or DMRS port.

For example, preambles or DMRS ports may be grouped, and groups of preambles or DMRS ports may be corresponding to different quantities of repetitions of the UCI.

With reference to the second aspect, in some implementations of the second aspect, a size of the first resource set is related to the number of repetitions of the uplink control information.

With reference to the second aspect, in some implementations of the second aspect, the first resource set includes a plurality of resource subsets used to repeatedly transmit the uplink control information, and each resource subset is used to repeatedly transmit the uplink control information once.

With reference to the second aspect, in some implementations of the second aspect, at least two resource subsets in the plurality of resource subsets are located in different frequency bands.

With reference to the second aspect, in some implementations of the second aspect, the uplink control information includes at least one of the following:

a modulation and coding scheme, a number of repetitions, a new data indicator, a HARQ process, a redundancy version, indication information of a PUSCH resource, a scrambling ID, and a reference signal configuration.

The modulation and coding scheme is used to indicate a modulation and coding scheme corresponding to the uplink data corresponding to the uplink control information. The number of repetitions is used to indicate a number of times of retransmission of the data and/or the preamble during one transmission. The new data indicator is used to indicate first transmission of new data or indicate retransmission of the data. The HARQ process is used to indicate an index of a HARQ process that is in at least one HARQ process and in which the data is transmitted. The redundancy version is used to indicate a redundancy version that is in at least one redundancy version and that is used for transmitting the data. The indication information of the PUSCH resource is used to indicate a size and/or location information of a PUSCH resource used for current transmission. The scrambling ID is used to indicate a scrambling ID for transmission of the data and/or a scrambling ID of a DMRS associated with a PUSCH carrying the data. The reference signal configuration is used to indicate configuration information for transmission of a reference signal corresponding to an uplink reference signal, and the reference signal includes a channel SRS and a DMRS associated with the PUSCH carrying the data.

Optionally, at least one format of at least one piece of UCI information transmitted on a same PUSCH resource may be the same, or may be different.

Further, a type and/or size of information included in the uplink control information may have an association relationship with the preamble or DMRS port.

In other words, different preambles or DMRS ports may be corresponding to different UCI formats. A UCI format corresponding to one preamble or DMRS port may be predefined, or may be configured by the access network device. That is, the access network device may configure a UCI format corresponding to each preamble or DMRS port. When receiving the UCI, the access network device may determine, based on a correspondence between a preamble and a UCI format or a correspondence between a DMRS port and a UCI format, a UCI format corresponding to a preamble or DMRS by detecting the preamble or DMRS.

It should be understood that the UCI format may refer to the type and/or size of the information carried in the UCI.

In a possible implementation, the access network device receives the uplink data on a first data resource set, the PUSCH resource includes the first data resource set, and the first data resource set is a resource that is in the PUSCH resource and that is other than the plurality of resource sets and a resource set carrying a DMRS.

In a possible implementation, the access network device receives the uplink data on a second data resource set, the PUSCH resource includes the second data resource set, the second data resource set is a resource determined based on the first resource set and PUSCH time-frequency resource indication information, and the uplink control information includes the PUSCH time-frequency resource indication information.

For example, the PUSCH time-frequency resource indication information may be used to indicate a size and a location of a PUSCH resource used for current transmission.

In a possible implementation, each resource set includes a time-frequency resource and a code domain resource. Time-frequency resources of the plurality of resource sets are the same, but code domain resources corresponding to the resource sets are different.

For example, different resource sets (UCI resource) on a same PUSCH resource may use a same time-frequency resource, namely, a same RE, and the UCI resources are distinguished by using different code domain resources. For example, different UCI resources include different code domain cyclic shifts, different orthogonal cover codes, or different spreading sequences (spreading sequence). The code domain resource is associated with the preamble or DMRS port. For example, as long as the terminal device determines a preamble index or a DMRS port number (port index) that needs to be sent, a code domain resource of UCI on a PUSCH resource corresponding to the preamble or the DMRS port may be determined.

According to a third aspect, an uplink control information transmission apparatus is provided. The apparatus includes a module corresponding to the method/operation/step/action described in any one of the first aspect and the possible implementations of the first aspect.

The module included in the foregoing apparatus may be a hardware circuit, may be software, or may be implemented by a combination of a hardware circuit and software.

According to a fourth aspect, an uplink control information transmission apparatus is provided. The apparatus includes a module corresponding to the method/operation/step/action described in any one of the second aspect and the possible implementations of the second aspect.

The module included in the foregoing apparatus may be a hardware circuit, may be software, or may be implemented by a combination of a hardware circuit and software.

According to a fifth aspect, an uplink control information transmission apparatus is provided. The apparatus includes a processor. The processor is coupled to a memory, and may be configured to execute instructions in the memory, to implement the method according to any one of the first aspect and the possible implementations of the first aspect.

Optionally, the apparatus further includes the memory.

Optionally, the apparatus further includes a communication interface, and the processor is coupled to the communication interface.

In an implementation, the apparatus is a terminal device. When the communication apparatus is a terminal device, the communication interface may be a transceiver, or an input/output interface.

In another implementation, the apparatus is a chip configured in a terminal device. When the apparatus is the chip configured in the terminal device, the communication interface may be an input/output interface of the chip.

Optionally, the transceiver may be a transceiver circuit. Optionally, the input/output interface may be an input/output circuit.

According to a sixth aspect, an uplink control information transmission apparatus is provided. The apparatus includes a processor. The processor is coupled to a memory, and may be configured to execute instructions in the memory, to implement the method according to any one of the second aspect and the possible implementations of the second aspect.

Optionally, the apparatus further includes the memory.

Optionally, the apparatus further includes a communication interface, and the processor is coupled to the communication interface.

In an implementation, the apparatus is an access network device. When the communication apparatus is an access network device, the interface may be a transceiver, or an input/output interface.

In another implementation, the apparatus is a chip disposed in the access network device. When the apparatus is a chip configured in the access network device, the communication interface may be an input/output interface of the chip.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to: receive a signal by using the input circuit, and transmit a signal by using the output circuit, so that the processor performs the method according to any one of the first aspect and the possible implementations of the first aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments.

According to an eighth aspect, a processing apparatus is provided. The apparatus includes a processor and a memory. The processor is configured to: read instructions stored in the memory, receive a signal by using a receiver, and transmit a signal by using a transmitter, to perform the method according to any one of the first aspect and the possible implementations of the first aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments.

It should be understood that a related data exchange process, for example, sending uplink control information, may be a process of outputting the uplink control information from the processor, and receiving uplink control information may be a process of receiving the uplink control information by the processor. For example, data output by the processor may be output to a transmitter, and input data received by the processor may be from a receiver. The transmitter and the receiver may be collectively referred to as a transceiver.

The processing apparatus in the eighth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, may be located outside the processor, or may exist independently.

According to a ninth aspect, a computer program product is provided. The computer program product includes a computer program (also referred to as code or instructions). When the computer program is run on a communication apparatus, the communication apparatus is enabled to perform the method according to any one of the first aspect and the possible implementations of the first aspect.

According to a tenth aspect, a computer-readable medium is provided. The computer-readable medium stores a computer program (also referred to as code or instructions). When the computer program is run on a communication apparatus, the communication apparatus is enabled to perform the method according to any one of the first aspect and the possible implementations of the first aspect.

According to an eleventh aspect, a communication system is provided. The communication system includes the foregoing access network device and terminal device.

DETAILED DESCRIPTION OF THE EMBODIMENTS

Figure 1:
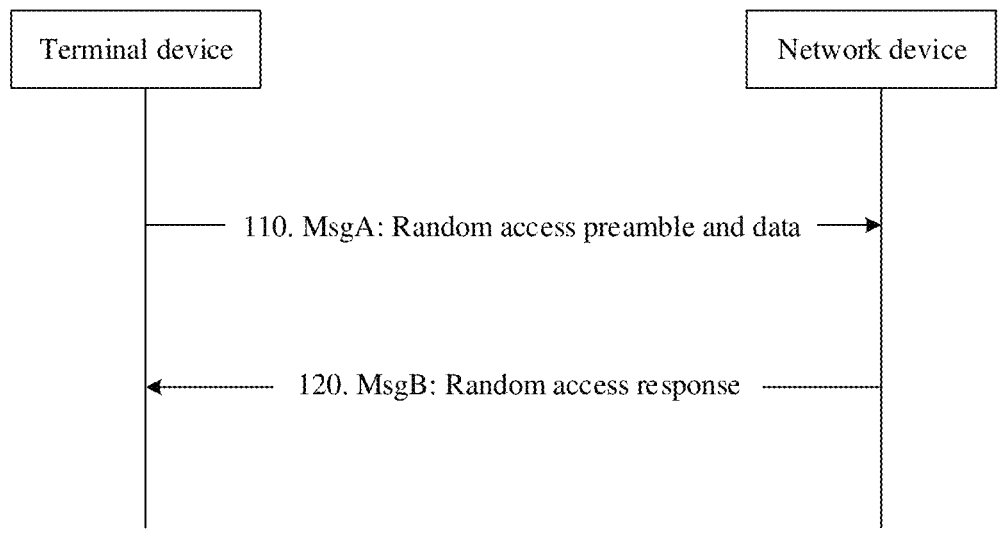
FIG. 1 is a schematic flowchart of a 2-step RACH.

The following describes solutions of the embodiments with reference to the accompanying drawings.

The solutions of embodiments may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

A terminal device in the embodiments may be user equipment, an access terminal, a subscriber unit, a subscriber station, a mobile station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments.

An access network device in the embodiments may be a device configured to communicate with a terminal device. The access network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the access network device may be a relay station, an access point, a vehicle-mounted device, a wearable device, a network device in a future 5G network, an access network device in a future evolved PLMN network, or the like. This is not limited in the embodiments.

In the embodiments, the terminal device or the access network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments is not limited in the embodiments, provided that a program that records code of the method provided in the embodiments can be run to perform communication based on the method provided in the embodiments. For example, the execution body of the method provided in the embodiments may be the terminal device or the access network device, or a functional module that can invoke and execute the program in the terminal device or the access network device.

In addition, aspects or features of the embodiments may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in the embodiments may represent one or more devices and/or other machine-readable media that are configured to store information. The term "machine-readable media" may include but is not limited to a radio channel and various other media that can store, include, and/or carry instructions and/or data.

In a conventional mobile broadband (MBB) service scenario, a wireless transmission service does not require high transmission latency, an MBB service packet transmitted each time is relatively large, and a corresponding overhead proportion of a control channel transmitted along with a data channel is relatively low. Therefore, when a conventional terminal in idle/inactive state needs to initiate random access, a random access procedure is usually completed by using a four-step random access channel (RACH) procedure.

For the 4-step random access procedure, considering a waiting period of data processing, it takes about dozens of milliseconds to complete a 4-step RACH procedure. This cannot satisfy a requirement of a new low-latency service.

For example, an ultra-reliable low-latency communication (URLLC) service, a massive machine type communications (mMTC) service, and the like cannot be satisfied. Therefore, a 2-step RACH solution is introduced. FIG. 1 is a schematic flowchart of a 2-step RACH. A solution of the 2-step RACH includes step 110 and step 120.

110: A terminal device sends a message A (a MsgA). The MsgA includes a random access preamble preamble and a PUSCH.

120: The terminal device receives a response message B (a MsgB) that is for the MsgA and sent by a network device.

In this embodiment, the MsgB includes a response to the preamble and a response to the PUSCH.

For example, the response to the random access preamble in the MsgB may also be referred to as a random access response RAR. Herein, the RAR may include at least one of a timing advance (TA), a temporary cell radio network temporary identifier (temporary C-RNTI, TC-RNTI), an uplink grant (UL grant), and a preamble index. The response to the PUSCH is, for example, contention resolution information (CRM), and includes at least one of identification information of the terminal device, radio resource control connection (re-)setup (connection (re-)setup) information, and the like.

In an existing technology, uplink control information (UCI) may be transmitted by using a physical uplink shared channel (PUSCH) resource. For example, transmission of UCI on a PUSCH resource is supported in an NR system, and the UCI may carry a positive acknowledgement (, HARQ-ACK) and a channel state information (CSI) feedback. For example, the HARQ-ACK, a first part of the CSI feedback, and a second part of the CSI feedback may be sequentially mapped to the PUSCH resource. However, when UCI corresponding to a plurality of UEs is all transmitted on a same PUSCH resource, that is, when the plurality of UEs perform uplink transmission on the same PUSCH resource, resource elements (RE) occupied by the UCI corresponding to the plurality of UEs may completely overlap, that is, a resource collision occurs in the UCI corresponding to the plurality of UEs, resulting in a decrease in a success rate of UCI demodulation.

In view of this, the embodiments provide an uplink control information transmission method and apparatus, so that when a plurality of terminal devices share one PUSCH resource to transmit UCI, different terminal devices use different resource sets to carry the UCI. That is, an intersection set of resource sets that are corresponding to any two terminal devices and that carry the UCI is an empty set, so that a collision of resources carrying the UCI is avoided, and a success rate of UCI demodulation is increased.

The following describes the embodiments in detail with reference to the accompanying drawings. It should be understood that "first", "second", "third", and various sequence numbers in the following embodiments are merely used for differentiation for ease of description, and are not used to limit the scope of the embodiments. For example, different preambles and different time-frequency resources are distinguished.

It should be further understood that, in the embodiments shown below, "pre-obtaining" may include being indicated by using access network device signaling or predefined, for example, defined in a protocol. "Predefinition" may be implemented in a manner in which corresponding code, a table, or other related indication information may be pre-stored in a device (for example, including a terminal device and an access network device). A specific implementation of "predefinition" is not limited in the embodiments.

It should be further understood that "store" in the embodiments may mean that the code, the table, or the information is stored in one or more memories. The one or more memories may be separately disposed, or may be integrated into an encoder, a decoder, a processor, or a communication apparatus. Alternatively, some of the one or more memories may be separately disposed, and some of the one or more memories are integrated into a decoder, a processor, or a communication apparatus. A type of the memory may be any form of storage medium. This is not limited in the embodiments.

An application scenario of the embodiments is first briefly described with reference to FIG. 2.

Figure 2:
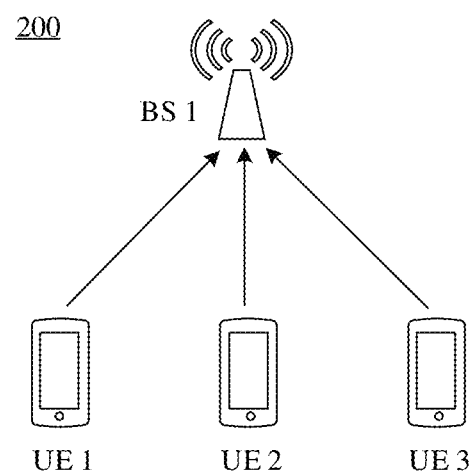
FIG. 2 is a schematic diagram of an application scenario according to an embodiment.

As shown in FIG. 2, a system 200 includes an access network device (for example, a BS 1), and the access network device may include one or more antennas. In addition, the system 200 further includes a plurality of UEs, for example, UE 1 to UE 3. The access network device BS 1 and the UE 1 to the UE 3 may form a single-cell communication system.

The access network device may communicate with a plurality of terminal devices (for example, the UE 1 to the UE 3). However, it may be understood that the access network device may communicate with any number of terminal devices. Any one of the UE 1 to the UE 3 may be, for example, a cellular phone, a smartphone, a portable computer, a handheld communication device, a handheld computing device, a satellite radio apparatus, a global positioning system, a PDA, and/or any other suitable device configured to perform communication in the wireless communication system 200.

For example, in the system 200 shown in FIG. 2, the access network device may configure a same resource for the plurality of terminal devices, where the resource is used by the plurality of terminal devices to perform uplink communication. In other words, the access network device may configure a same resource for the plurality of terminal devices, where the resource is used by the plurality of terminal devices to perform uplink communication with the access network device.

It should be understood that FIG. 2 is merely a simplified schematic diagram of an example, and a network may further include another access network device, which is not limited in the embodiments.

The solutions of the embodiments may be applied to a wireless communication system, and two communication apparatuses in the wireless communication system may have a wireless communication connection relationship. One of the two communication apparatuses may be, for example, an access network device or a chip disposed in the access network device, and the other of the two communication apparatuses may be, for example, a terminal device or a chip disposed in the terminal device.

Without loss of generality, the following first describes an embodiment in detail by using a transmission process between a terminal device and an access network device as an example. It may be understood that any terminal device in the wireless communication system or a chip disposed in the terminal device may transmit uplink control information based on a same method. This is not limited in the embodiments.

Figure 3:
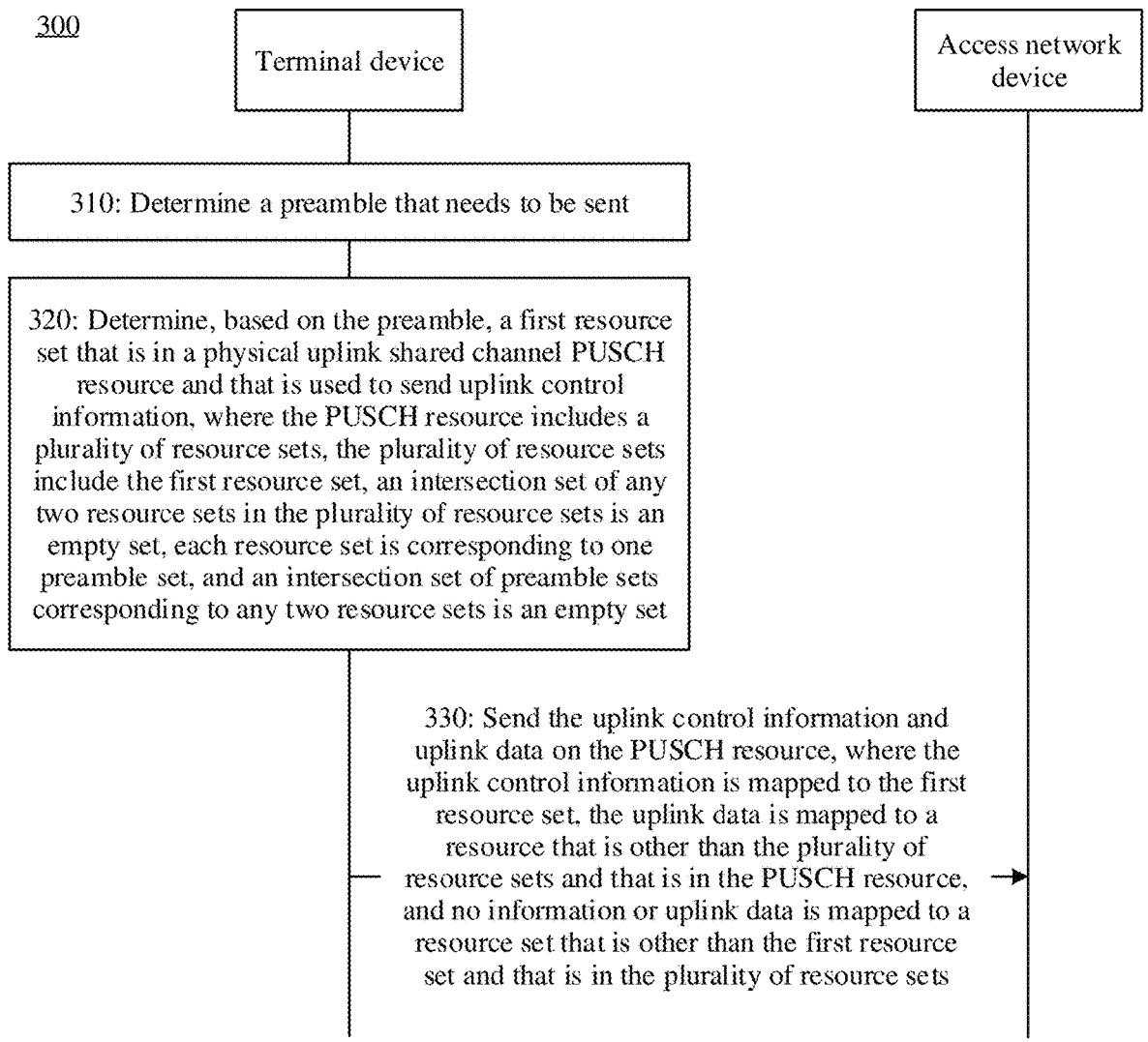
FIG. 3 is a schematic flowchart of an uplink control information transmission method according to an embodiment.

FIG. 3 is a schematic flowchart of an uplink control information transmission method from a perspective of device interaction. As shown in FIG. 3, the method 300 may include step 310 to step 330. The following describes each step in the method 300 in detail with reference to FIG. 3.

It should be noted that the method 300 may be applied to the communication system 200 shown in FIG. 2. For example, the method 300 may be applied to a 2-step RACH procedure, or the method 300 may be applied to a grant-free traffic flow procedure or another communication system.

It should be understood that, in the embodiments, "PUSCH resource" may be a PUSCH time-frequency resource.

310: A terminal device determines a preamble that needs to be sent.

For example, in a 2-step RACH procedure, a MsgA includes a random access preamble and data. A resource element used for sending the MsgA includes a resource element used to send the preamble and a resource element used to send the data. The preamble is transmitted on a physical random access channel (PRACH) time-frequency resource block. The resource element used to send the preamble may be considered as a PRACH time-frequency resource block (for example, a PRACH occasion). One PRACH resource block may carry one or more preambles, and one preamble may be corresponding to one preamble index. A PUSCH resource used to send the data may be associated with one or more demodulation reference signal (DMRS) ports, and one DMRS port may be corresponding to one DMRS port number. Therefore, the resource element used to send the data may be defined as a PUSCH resource and a DMRS port number associated with the PUSCH resource.

That is, in a possible implementation, the terminal device may alternatively determine the DMRS port number. For example, in grant-free transmission, a plurality of terminal devices may perform communication by using a same resource block, and one UE in the plurality of UEs may determine a DMRS port number, that is, may determine a resource unit for performing communication.

It should be understood that the grant-free transmission may also be referred to as uplink transmission without dynamic grant or uplink transmission with configured grant, and includes two types of grant-free transmission. For first-type grant-free transmission, a grant-free time-frequency resource is configured and activated/deactivated by using a radio resource control (RRC) message. For second-type grant-free transmission, the grant-free time-frequency resource configures, by using an RRC message and downlink control information (DCI), a time-frequency resource and a transmission parameter that are used for uplink transmission. Alternatively, the grant-free time-frequency resource and/or the transmission parameter may be modified by using DCI. When uplink data arrives, instead of sending a scheduling request (SR) to a network device to request the network device to allocate an uplink transmission resource, and sending the uplink data to the network device after receiving grant information sent by the network device, the terminal device directly sends the uplink data to the network device by using a resource pre-allocated by the network device, a specified transmission parameter, and the like.

Optionally, before the terminal device determines the preamble, the terminal device may receive configuration information sent by an access network device. The configuration information includes information that may be used to determine a number of resource sets included in physical uplink shared channel resources and/or information that is used to determine a resource size required by each resource set.

For example, at least one terminal device in a same cell may receive a broadcast message sent by the access network device, where the broadcast message carries at least one of the following information: information indicating a PUSCH resource used by the at least one terminal device to communicate with the access network device, information used to determine a number of resource sets that are reserved in the PUSCH resource and that can be used to carry UCI, and information used to determine a number of REs that are in the PUSCH resource and that are included in each resource set that carries the UCI.

320: The terminal device determines, based on the preamble, a first resource set that is in a PUSCH resource and that is used to send uplink control information, where the PUSCH resource includes a plurality of resource sets, the plurality of resource sets include the first resource set, an intersection set of any two resource sets in the plurality of resource sets is an empty set, each resource set is corresponding to one preamble set, and an intersection set of preamble sets corresponding to any two resource sets is an empty set.

In other words, the terminal device may determine the resource set in the PUSCH resource based on the determined preamble, and the terminal device may send the UCI by using the determined resource set. When sharing the PUSCH resource, different terminal devices may select different resource sets in the PUSCH resource based on different determined preambles. The PUSCH resource may include the plurality of resource sets. Any resource set in the plurality of resource sets may be associated with a preamble or a preamble sequence set, and an intersection set between any two resource sets is an empty set. The terminal device may select a preamble used by the terminal device, and then use a resource set associated with the preamble to carry the UCI of the terminal device. If a plurality of terminal devices send UCI by sharing one PUSCH resource, as long as the plurality of terminal devices select different preambles (where alternatively, the selected preambles are located in different preamble sets), resource sets that are determined based on the preambles and that are used to carry the UCI are different, so that a resource collision does not occur.

In the embodiments, one preamble or DMRS port may be corresponding to one resource set used to transmit uplink control information; or a plurality of preambles or DMRS ports may be corresponding to one resource set used to transmit uplink control information. In this embodiment, the preambles or the DMRS ports may be in a one-to-one correspondence with the resource sets used to carry the UCI, or a number of the preambles or DMRS ports is an integer multiple of a number of the resource sets used to carry the UCI. That is, a plurality of preambles or DMRS ports may be corresponding to one resource set used to transmit the UCI. This is not limited in the embodiments.

For the access network device, the access network device may receive the preamble sent by the terminal device. The access network may determine, based on the received preamble, the first resource set that is in the PUSCH resource and that is used to receive the uplink control information sent by the terminal device, where the PUSCH resource may include the plurality of resource sets, the plurality of resource sets may include the first resource set, an intersection set of any two resource sets in the plurality of resource sets is an empty set, each resource set is corresponding to one preamble set, and an intersection set of preamble sets corresponding to any two resource sets is an empty set.

Optionally, in this embodiment, a device (the terminal device or the access network device) may determine, based on any one of the preamble or the DMRS port, the first resource set that is in the PUSCH resource and that is used to transmit (send or receive) the uplink control information.

Implementations of determining the resource set that is in the PUSCH resource and that is used to carry the UCI may include but are not limited to the following two manners.

Manner 1

For example, in this embodiment, the PUSCH resource (a PUSCH time-frequency resource) may be associated with one or more PRACH preambles.

For example, a resource set used to send the UCI may be determined based on an index of the preamble.

For example, in the 2-step RACH procedure, the PUSCH resource may be associated with preambles whose indexes are #0 to #3. When four UEs share the PUSCH resource, any UE may select any one of the preambles whose indexes are #0 to #3. For example, if the preamble selected by UE 1 is the preamble whose index is #1, a first resource set used by the UE 1 to send UCI 1 may be determined in the PUSCH resource based on the preamble whose index is #1.

Optionally, the association relationship between the PUSCH resource and the one or more PRACH preambles may be pre-obtained.

For example, the access network device may indicate the association relationship by using signaling, and the association relationship may be an association relationship between the preamble and the PUSCH resource or may be an association relationship between the index of the preamble and the PUSCH resource.

Optionally, the association relationship between the PUSCH resource and the one or more PRACH preambles may be pre-defined. "Predefinition" may be implemented in a manner in which corresponding code, a table, or other related indication information may be prestored in a device (for example, including the terminal device and the access network device). A specific implementation of "predefinition" is not limited in the embodiments.

Optionally, the association relationship between the PUSCH resource and the one or more PRACH preambles may be defined in a protocol.

It should be understood that "protocol" in the embodiments may refer to a standard protocol in the communication field.

For example, "protocol" may include an LTE protocol, an NR protocol, and a related protocol applied to a future communication system. This is not limited in the embodiments.

Manner 2

For example, in this embodiment, the PUSCH resource (a PUSCH time-frequency resource) may be associated with one or more DMRS ports.

For example, a resource set used to send the UCI may be determined based on a port number of the DMRS port.

For example, the PUSCH resource may be associated with DMRS ports whose port numbers are #0 to #3. When four UEs share the PUSCH resource, any UE may select any one of the DMRS ports whose port numbers are #0 to #3. For example, if UE 1 selects a DMRS port whose port number is #1, a first resource set used by the UE 1 to send UCI 1 may be determined in the PUSCH resource based on the DMRS port whose port number is #1.

Optionally, the association relationship between the PUSCH resource and the one or more DMRS ports may be pre-obtained.

For example, the association relationship may be indicated by the access network device by using signaling, and the association relationship is an association relationship between the DMRS port or the port number of the DMRS port and the PUSCH resource. For example, the DMRS port or the port number of the DMRS port may be associated with a resource set in the PUSCH resource, and the resource set is used to select a terminal device corresponding to the DMRS port or the port number of the DMRS port to send the UCI.

Optionally, the association relationship between the PUSCH resource and the one or more DMRS ports may be pre-defined. "Predefinition" may be implemented in a manner in which corresponding code, a table, or other related indication information may be prestored in a device (for example, including the terminal device and the access network device). A specific implementation of "predefinition" is not limited in the embodiments.

Optionally, the association relationship between the PUSCH resource and the one or more DMRS ports may be defined in a protocol.

It should be understood that "protocol" in the embodiments may refer to a standard protocol in the communication field.

For example, "protocol" may include an LTE protocol, an NR protocol, and a related protocol applied to a future communication system. This is not limited in the embodiments.

Optionally, a number of resource sets that carry a plurality of pieces of UCI on the PUSCH resource may be related to a number of preambles (or a number of preamble sets) associated with the PUSCH resource, or related to a number of DMRS ports associated with the PUSCH resource.

For example, the number of resource sets that carry a plurality of pieces of UCI on the PUSCH resource may be equal to the number of preambles associated with the PUSCH resource, or the number of DMRS ports associated with the PUSCH resource.

In an example, if the number of resource sets that carry a plurality of pieces of UCI on the PUSCH resource is equal to the number of preambles associated with the PUSCH resource, the preambles and the resource sets (UCI resources) may be in a one-to-one mapping relationship. In another example, the number of resource sets that carry a plurality of pieces of UCI on the PUSCH resource is equal to the number of preamble sets associated with the PUSCH resource.

It should be understood that, in the embodiments, the UCI resource represents a resource set that carries UCI. In descriptions about uplink control information transmission in the embodiments, "resource set" and "UCI resource" may be used interchangeably.

The terminal device determines a sent preamble, and determines a location of a UCI resource in the PUSCH resource based on the preamble.

In an example, if the number of resource sets that carry a plurality of pieces of UCI on the PUSCH resource is equal to the number of DMRS ports associated with the PUSCH resource, the DMRS ports and the UCI resources may be in a one-to-one mapping relationship.

That is, if the terminal device determines a used DMRS port number (or index), a location of a UCI resource in the PUSCH resource may be determined.

In this embodiment, the uplink control information may include information used to demodulate data carried on the PUSCH resource. A format of the UCI information is configured by the access network device, or may be agreed upon in advance.

Optionally, the uplink control information may include at least one of the following:

a modulation and coding scheme, a number of repetitions, a new data indicator, a HARQ process, a redundancy version, a physical uplink shared channel time-frequency resource, a scrambling ID, and a reference signal configuration.

The modulation and coding scheme is used to indicate a modulation and coding scheme corresponding to the uplink data corresponding to the uplink control information. The number of repetitions is used to indicate a number of times of retransmission of the data and/or the preamble during one transmission. The new data indicator is used to indicate first transmission of new data or indicate retransmission of the data. The HARQ process is used to indicate an index of a HARQ process that is in at least one HARQ process and in which the data is transmitted. The redundancy version is used to indicate a redundancy version that is in at least one redundancy version and that is used for transmitting the data. The indication information of the PUSCH resource is used to indicate a size and/or location information of a PUSCH resource used for current transmission. The scrambling ID is used to indicate a scrambling ID for transmission of the data and/or a scrambling ID of a DMRS associated with a PUSCH carrying the data. The reference signal configuration is used to indicate configuration information for transmission of a reference signal corresponding to an uplink reference signal, and the reference signal includes a channel SRS and a DMRS associated with the PUSCH carrying the data.

In another embodiment, the UCI control information may further include a HARQ-ACK and CSI.

Optionally, at least one format of at least one piece of UCI information transmitted on a same PUSCH resource may be the same, or may be different.

Further, a type and/or size of information included in the uplink control information may have an association relationship with the preamble or DMRS port.

In other words, different preambles or DMRS ports may be corresponding to different UCI formats. A UCI format corresponding to one preamble or DMRS port may be predefined, or may be configured by the access network device. That is, the access network device may configure a UCI format corresponding to each preamble or DMRS port. When receiving the UCI, the access network device may determine, based on a correspondence between a preamble and a UCI format or a correspondence between a DMRS port and a UCI format, a UCI format corresponding to a preamble or DMRS by detecting the preamble or DMRS.

It should be understood that the UCI format may refer to the type and/or size of the information carried in the UCI.

For example, a first terminal device determines a first preamble sequence/first DMRS port, and an MCS corresponding to the first preamble sequence/first DMRS port is fixed. In this case, first uplink control information corresponding to the first terminal device may not include MCS indication information.

For example, a second terminal device determines a second preamble sequence/second DMRS port, the second preamble sequence/second DMRS port may be corresponding to a plurality of optional MCSs, and a resource carrying data in the PUSCH resource is fixed. In this case, first uplink control information corresponding to the second terminal device may include MCS indication information, but does not include PUSCH resource indication information.

330: The terminal device sends the uplink control information and the uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

In other words, the PUSCH resource further includes a resource carrying data, and the data is carried on a resource that is other than a resource carrying UCI and that is in the PUSCH resource, that is, the data may be carried on a resource that is other than the plurality of resource sets and that is in the PUSCH resource.

For the access network device, the access network device may receive the uplink control information and the uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

With reference to FIG. 4 to FIG. 15, the following describes in detail possible implementations of determining the resource set that carries the UCI and that is in the PUSCH resource.

For example, in this embodiment, the PUSCH resource (the PUSCH time-frequency resource) may be associated with the one or more PRACH preambles (or DMRS ports).

In a possible implementation, a mapping rule may exist between the PUSCH resource and the one or more preambles (or DMRS ports).

In an example, the mapping rule may be: starting from a first symbol to which no DMRS is mapped, the at least two pieces of uplink control information are mapped to the physical uplink shared channel resource set at a granularity of resource element (RE) and first in frequency domain and then in time domain. The first symbol to which no DMRS is mapped is the first symbol to which no DMRS is not mapped and that is in the physical uplink shared channel resource set, or the first symbol to which no DMRS is mapped after a DMRS symbol is mapped and that is in the physical uplink shared channel resource set. Although the foregoing mapping rule is a UCI-to-resource mapping rule, because the UCI is in a one-to-one correspondence with the resource set, the mapping rule may also be understood as a method or rule used to determine a location of the resource set in the PUSCH resource.

Optionally, resources that are occupied by the plurality of resource sets and that are in the PUSCH resource may be consecutively mapped in frequency domain.

One resource set may carry one piece of UCI, and all resources in the plurality of resource sets may be consecutively mapped in frequency domain, that is, all REs that carry the plurality of pieces of UCI and that are in the PUSCH resource may be consecutive.

Figure 4:
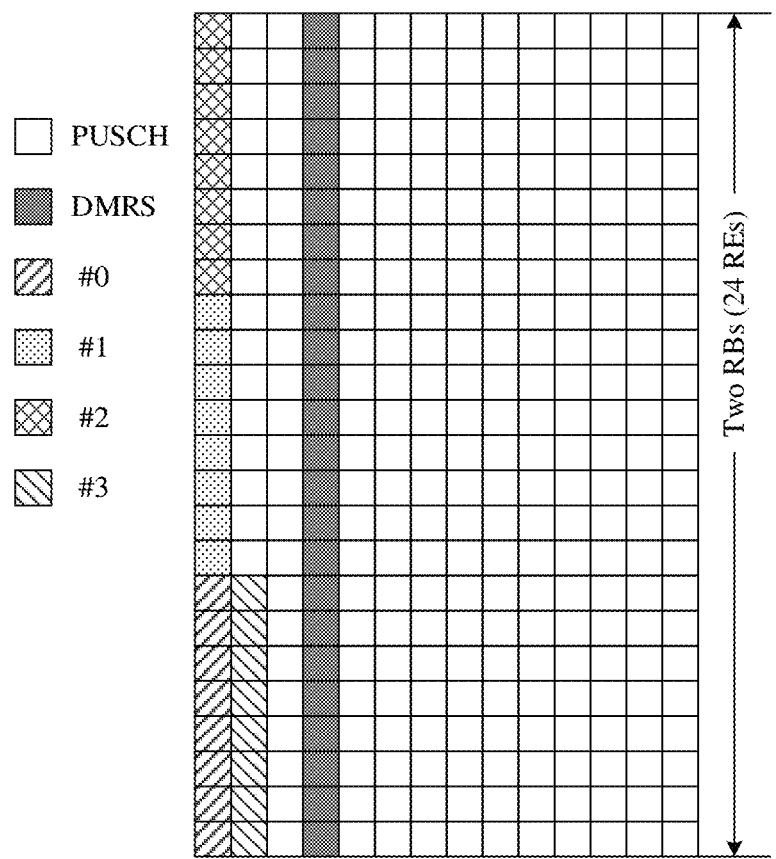
FIG. 4 is a schematic diagram of a resource set carrying UCI according to an embodiment.

For example, as shown in FIG. 4, $N_{UCI}$ UCI resources may be consecutively mapped to $N_{total}$ REs in an order of indexes. $N_{total}$ represents a total number of REs reserved on the PUSCH resource for all UCI resources, $N_{UCI}$ represents a number of pieces of UCI carried on the PUSCH resource, and $N_{RE}$ represents a number of REs required to carry one piece of UCI. In FIG. 4, for example, bandwidth of the PUSCH resource=2 RBs, $N_{UCI}$=4, and $N_{RE}$=8. The $n^{th}$ UCI resource is mapped to the $(n*N_{RE}+a)^{th}$ RE in the $N_{total}$ REs, where a=0, 1, 2, . . . , and $N_{RE}-1$, where UCI carried on the PUSCH resource is numbered in ascending order of indexes of at least one preamble associated with the UCI, and the $N_{total}$ REs are numbered first in frequency domain and then in time domain.

For example, as shown in FIG. 4, the PUSCH resource includes four UCI resources, namely, the $0^{th}$ UCI resource set to a third UCI resource set. For RE resources that are occupied by the $0^{th}$ UCI resource set and that are in the PUSCH resource, it is determined, based on $n*N_{RE}+a$, where $a=0, 1, 2, \ldots$, and $N_{RE}-1$, that the REs corresponding to the $0^{th}$ UCI resource set are the $0^{th}$ RE to the $7^{th}$ RE.

It can be understood from FIG. 4 that REs included in each UCI resource are also consecutively arranged first in frequency domain and then in time domain and in ascending order of numbers of the REs.

Figure 5:
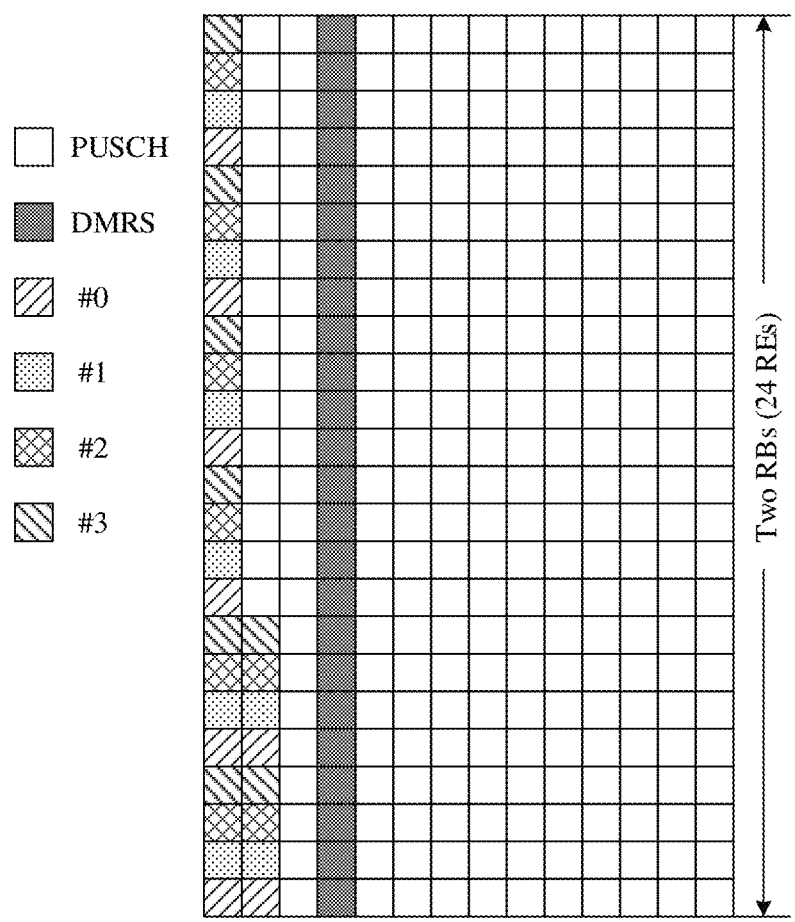
FIG. 5 is a schematic diagram of a resource set carrying UCI according to another embodiment.

For example, as shown in FIG. 5, $N_{UCI}$ UCI resources may be alternately and consecutively mapped to $N_{total}$ REs based on indexes. $N_{total}$ represents a total number of REs reserved on the PUSCH resource for all UCI resources, $N_{UCI}$ represents a number of pieces of UCI carried on the PUSCH resource, and $N_{RE}$ represents a number of REs required to carry one piece of UCI. In FIG. 5, for example, bandwidth of the PUSCH resource=2 RBs, $N_{UCI}=4$, and $N_{RE}=8$. The $n^{th}$ UCI resource is mapped to the $(b*N_{UCI}+n)^{th}$ RE in the $N_{total}$ REs, where $b=0, 1, 2, \ldots$, and $N_{RE}-1$. UCI carried on the PUSCH resource is numbered in ascending order of indexes of at least one preamble associated with the UCI, and the $N_{total}$ REs are numbered first in frequency domain and then in time domain.

Optionally, resources that are occupied by the plurality of resource sets and that are in the PUSCH resource may be inconsecutive in frequency domain.

One resource set may carry one piece of UCI, and resources occupied by the plurality of resource sets may be inconsecutive in frequency domain. In an example, a mapping rule may include: If a number of REs that are not used and that can be used on the $i^{th}$ symbol to carry the UCI is less than or equal to a number of REs required by a remaining unmapped part of the at least two pieces of uplink control information, the at least two pieces of uplink control information are consecutively mapped to the $i^{th}$ symbol at a granularity of RE; and if the number of REs that are not used and that can be used on the $i^{th}$ symbol to carry the UCI is greater than the number of REs required by the remaining unmapped part of the at least two pieces of uplink control information, the at least two pieces of uplink control information are inconsecutively mapped to the $i^{th}$ symbol at a granularity of RE, where the $i^{th}$ symbol starts from the first symbol to which no DMRS is mapped and is less than or equal to a largest symbol in the uplink shared resource set, and i is a positive integer. Although the foregoing mapping rule is a UCI-to-resource mapping rule, because the UCI is in a one-to-one correspondence with the resource set, the mapping rule may also be understood as a method or rule used to determine a location of the resource set in the PUSCH resource.

For example, the at least two pieces of uplink control information may be mapped in ascending order of i increased by 1 each time, until all of the at least two pieces of uplink control information are mapped.

For example, L is used to represent a symbol index of the PUSCH resource, and ranges from 0 to $N_{symball}^{PUSCH}-1$, where $N_{symball}^{PUSCH}$ represents a total number of symbols of the PUSCH resource, and all reference signal symbols are included. k is used to represent a subcarrier index of the PUSCH time-frequency resource, and ranges from 0 to $N_{SC}^{PUSCH}-1$, where $N_{SC}^{PUSCH}$ represents a total number of subcarriers of the PUSCH resource. $\Phi_L^{UL-SCH}$ is used to represent a set of REs that can be used for data transmission on the symbol L, and are arranged in ascending order of k, where $L=0, 1, 2, \ldots$, and $N_{symball}^{PUSCH}-1$. $M_{SC}^{UL-SCH}(L)=|\Phi_L^{UL-SCH}|$ is used to represent a number of REs included in the set $\Phi_L^{UL-SCH}$, and $\Phi_L^{UL-SCH}(j)$ is used to represent the $j^{th}$ RE in the set $\Phi_L^{UL-SCH}$. $\Phi_L^{UCI}$ is used to represent a set of REs that can be used for UCI transmission on the symbol L, and are arranged in ascending order of k, where $L=0, 1, 2, \ldots$, and $N_{symball}^{PUSCH}-1$. $M_{SC}^{UCI}(L)=|\Phi_L^{UCI}|$ is used to represent a number of REs included in the set $\Phi_L^{UCI}$, and $\Phi_L^{UCI}(j)$ used to represent the $j^{th}$ RE in the set $\Phi_L^{UCI}$. For a symbol that includes a DMRS, $\Phi_L^{UCI}=\emptyset$; and for a symbol that does not include a DMRS, $\Phi_L^{UCI}=\Phi_L^{UL-SCH}$. $\Phi_L^{rvd}=\emptyset$ is used to represent a set of REs reserved on the symbol L for UCI, where $L=0, 1, 2, \ldots$, and $N_{symball}^{PUSCH}-1$. $L_S$ is used to represent the first non-DMRS symbol of the PUSCH resource.

---

Set L=Ls; m=0; and $\Phi_L^{rvd}=\emptyset$, where $L=0,1,2, \ldots$, and $N_{symball}^{PUSCH}-1$;
while m<$N_{total}$
  if $M_{SC}^{UCI}(L)>0$
    if $N_{total}-m \geq M_{SC}^{UCI}(L)$
      d=1;
      m=$M_{SC}^{UC-SCH}(L)$;
    end if
    if $N_{total}-m<M_{SC}^{UCI}(L)$
      d = $\lfloor M_{SC}^{UCI}(L)/N_{rm})\rfloor*j$;
      M=$N_{total}$-m;
    end if
    for j=0 to m-1
      $\Phi_L^{rvd} = \Phi_L^{rvd} U \Phi_L^{UL-SCH}(j*d)$
      M=M+1;
    end for
  end if
  L=L+1;
end while

---

A meaning expressed by the foregoing instructions is: Starting from the first non-DMRS symbol, if a number of available REs of a current symbol is less than or equal to a number of REs required to carry the UCI, all available REs of the current symbol are used to carry the UCI; and if the number of available REs of the current symbol is greater than the number of REs required to carry the UCI, REs that are of the current symbol and that are indexed in ascending order in frequency domain, $\lfloor M_{SC}^{UCI}(L)/N_{rm}\rfloor*j$ and $j=0, 1, \ldots$, and $N_{rm}-1$, are reserved for the UCI, where $M_{SC}^{UCI}(L)$ represents a number of REs that can be used to carry the UCI and that are of the current symbol, and $N_{rm}$ indicates a number of REs required to carry remaining unmapped UCI.

Figure 6:
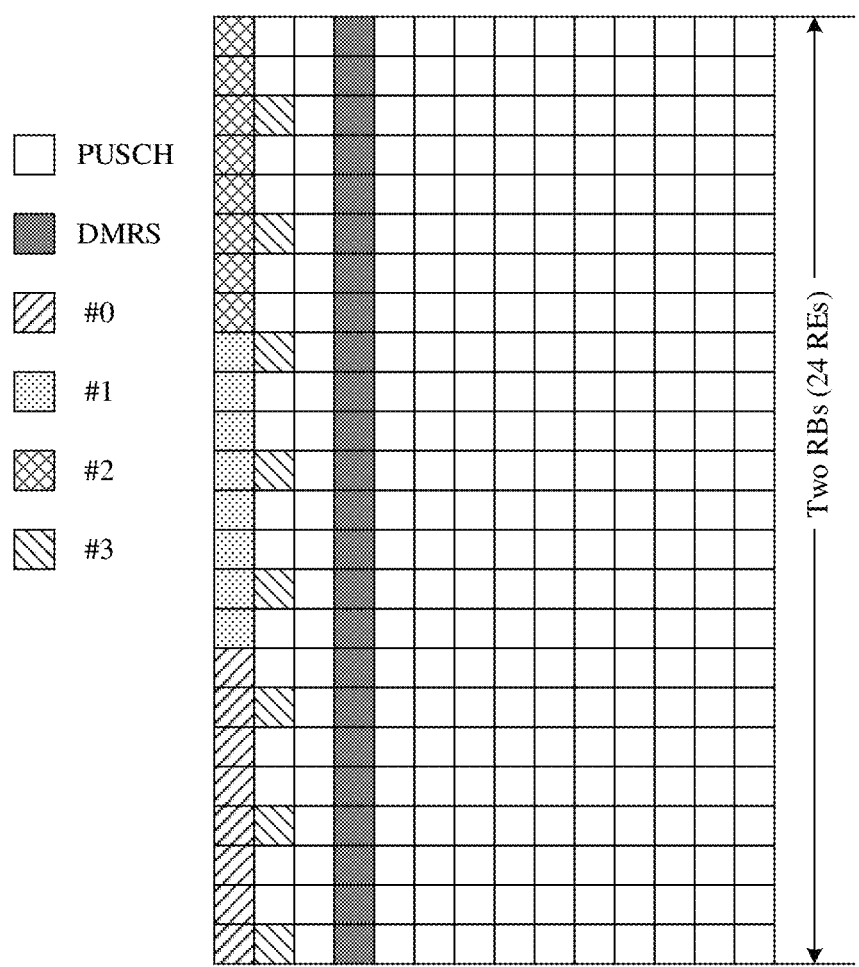
FIG. 6 is a schematic diagram of a resource set carrying UCI according to still another embodiment.

For example, as shown in FIG. 6, $N_{UCI}$ UCI resources may be inconsecutively mapped to $N_{total}$ REs in an order of indexes. $N_{total}$ represents a total number of REs reserved on the PUSCH resource for all UCI resources, $N_{UCI}$ represents a number of pieces of UCI carried on the PUSCH resource, and $N_{RE}$ represents a number of REs required to carry one piece of UCI. In FIG. 6, for example, bandwidth of the PUSCH resource=2 RBs, $N_{UCI}=4$, and $N_{RE}=8$. A number of REs required to carry an RE is 32. On a PUSCH time domain resource symbol 0, there are 24 available REs, which are fewer than 32 REs required to carry the UCI. Therefore, on the PUSCH time domain resource symbol 0, all available REs are used to carry the UCI. On a PUSCH time domain resource symbol 1, there are 24 available REs, and a number of REs currently required to carry the UCI is 8, that is, the number of available REs on the current symbol is greater than the number of REs required to carry the UCI. Therefore, eight REs used to carry the UCI may be determined in the 24 available REs.

It can be understood from FIG. 6 that REs included in each UCI resource are also inconsecutively arranged first in frequency domain and then in time domain and in ascending order of numbers of the REs.

Figure 7:
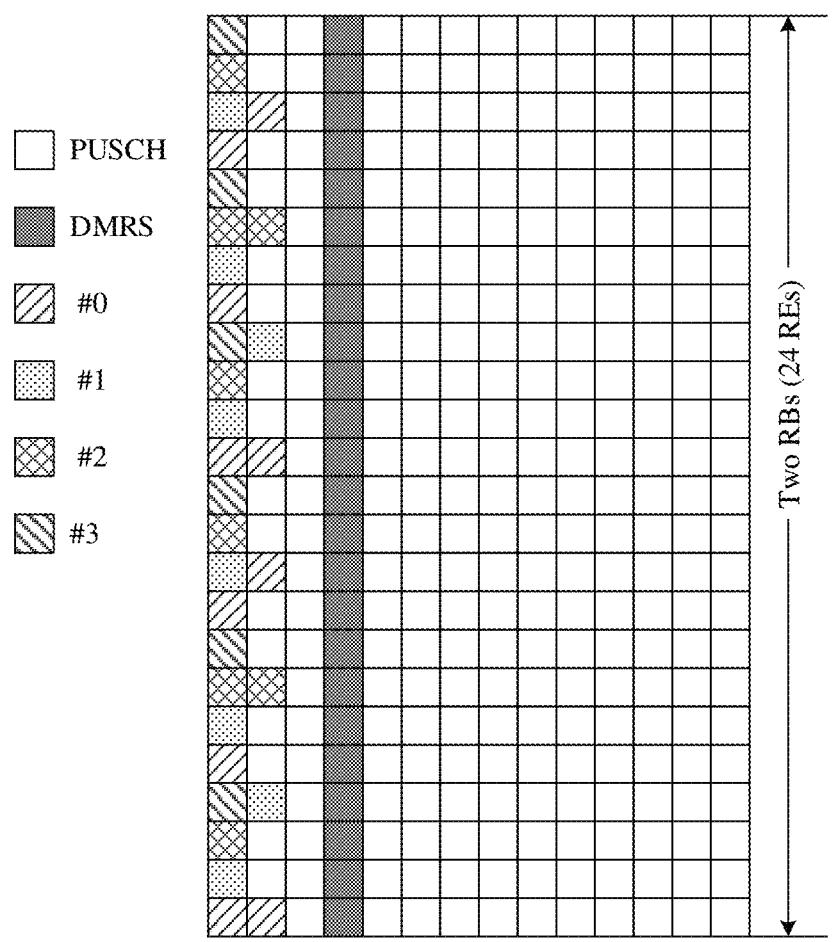
FIG. 7 is a schematic diagram of a resource set carrying UCI according to yet another embodiment.

Similarly, as shown in FIG. 7, $N_{UCI}$ UCI resources may be inconsecutively mapped to $N_{total}$ REs in an order of indexes.

Optionally, in a possible implementation, when frequency-domain frequency hopping is supported, that is, if frequency domain frequency modulation exists on the PUSCH resource, REs carrying all UCI may all be mapped to a first hop, or may be evenly mapped to a plurality of different hops. Independent mapping may be performed according to the foregoing mapping rule for each hop.

Optionally, in a possible implementation, when multi-stream transmission is supported, if multi-stream transmission exists on the PUSCH resource, REs carrying all UCI may all be mapped to a first stream, or may be evenly mapped to a plurality of different streams. Independent mapping may be performed according to the foregoing mapping rule for each stream.

In this embodiment, a plurality of resource sets for transmitting different UCI may be determined on the PUSCH resource based on determined preambles or DMRS ports, and the plurality of resource sets are orthogonal to each other. This prevents reliability of UCI of different UEs from deteriorating due to a time-frequency resource collision, so that a success rate of UCI demodulation is increased.

Optionally, in a possible implementation, there is a time-domain guard period and/or a frequency-domain guard band between any two resource sets in the plurality of resource sets included in the PUSCH resource.

Optionally, in a possible implementation, there is a time-domain guard period and/or a frequency-domain guard band between an RE in any resource set in the plurality of resource sets and an RE that is in the PUSCH resource and that is used to carry the uplink data.

The time-domain guard period and/or the frequency-domain guard band include one or a combination of the following: a guard period between UCI resources, a guard band between different UCI resources, a guard period between a UCI resource and a PUSCH resource, and a guard band between a UCI resource and a PUSCH resource.

Figure 8:
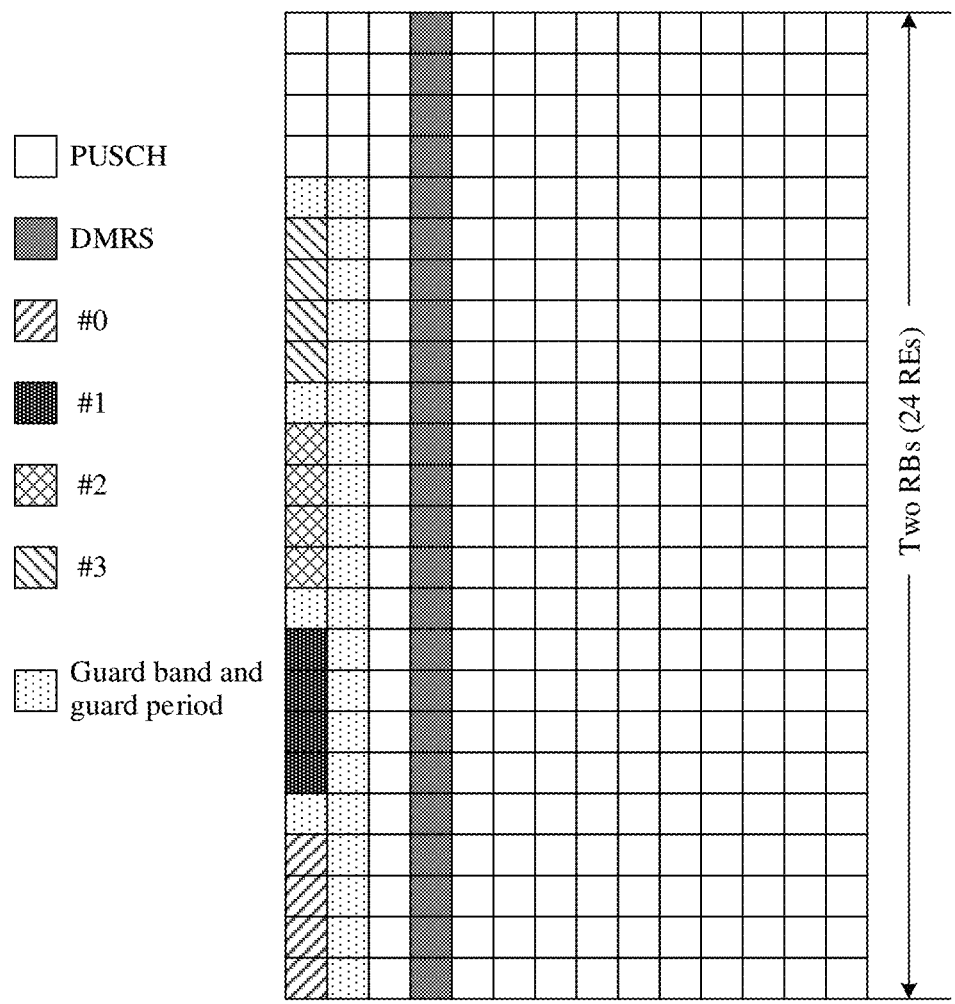
FIG. 8 is a schematic diagram of a resource set carrying UCI according to still yet another embodiment.

For example, as shown in FIG. 8, bandwidth of the PUSCH resource=2 RBs, $N_{UCI}$=4, $N_{RE}$=4, both the guard band between different UCI resources and the guard band between a UCI and a PUSCH resource are each one subcarrier, and the guard periods are each one symbol, where $N_{UCI}$ indicates a number of pieces of UCI carried on the PUSCH resource, and $N_{RE}$ indicates a number of REs required to carry one piece of UCI.

In an example, values of the guard period and guard band may be pre-obtained. For example, the values may be indicated by the access network device by using signaling or predefined, for example, defined in a protocol. "Predefinition" may be implemented in a manner in which corresponding code, a table, or other related indication information may be prestored in a device (for example, including the terminal device and the network device). A specific implementation of "predefinition" is not limited in the embodiments.

In this embodiment, a time-domain guard period and/or a frequency-domain guard band may be added between different UCI resources and between a UCI resource and a resource that carries data, so that inter-symbol interference and inter-subcarrier interference of different UEs that are caused by asynchronous transmission can be avoided or mitigated, thereby increasing a success rate of UCI demodulation.

Optionally, in a possible implementation, the UCI may be repeatedly mapped to the PUSCH resource. The number of repetitions may be configured by the access network device, or may be agreed upon in advance.

In an example, the configuration information sent by the access network device to the terminal device further includes a number of times that the uplink control information is mapped.

In other words, the first resource set that is used to send the uplink control information and that is determined by the terminal device based on the preamble or DMRS port may include a resource required by transmission of the uplink control information for one or more times. That is, a size of the first resource set is related to a number of repetitions of the uplink control information.

For example, a resource required by sending of the first uplink control information by the first terminal device is four REs. If the first uplink control information is transmitted on the PUSCH resource once, a size of the first resource set may be four REs. If the first uplink control information is repeatedly transmitted twice, a size of the first resource set may be eight REs.

Optionally, the UCI may be mapped on the PUSCH resource for a plurality of times according to the mapping rule shown in FIG. 4. That is, the UCI may be consecutively mapped to the PUSCH resource for a plurality of times in an order of indexes.

For example, FIG. 4 may further indicate an example in which bandwidth of the PUSCH resource=2 RBs, $N_{UCI}$=4, $N_{RE}$=4, and k=2, where $N_{UCI}$ indicates a number of pieces of UCI carried on the PUSCH resource, $N_{RE}$ indicates a number of REs required to carry one piece of UCI, and k indicates a number of repetitions. $N_{UCI}$ UCI resources may be consecutively mapped to $N_{total}$ REs in the order of indexes. The $n^{th}$ UCI resource is mapped to the $(n*N_{RE}+a)^{th}$ RE in the $N_{total}$ REs, where a=0, 1, 2, ..., and $k*N_{RE}-1$. The UCI carried on the PUSCH resource is numbered in ascending order of indexes of at least one preamble associated with the UCI, and the $N_{total}$ REs are numbered first in frequency domain and then in time domain Each piece of UCI may be repeatedly sent twice on the PUSCH resource.

Optionally, FIG. 5 may further indicate an example in which bandwidth of the PUSCH resource=2 RBs, $N_{UCI}$=4, $N_{RE}$=4, and k=2, where the UCI may be alternately and consecutively mapped to the PUSCH resource for a plurality of times in an order of indexes. For example, the UCI may be mapped on the PUSCH resource for a plurality of times according to the mapping rule shown in FIG. 5.

Optionally, the UCI may be mapped on the PUSCH resource for a plurality of times according to the mapping rule shown in FIG. 6 or FIG. 7. That is, the UCI may be inconsecutively mapped to the PUSCH resource for a plurality of times.

For example, FIG. 4 may further indicate an example in which bandwidth of the PUSCH resource=2 RBs, $N_{UCI}$=4, $N_{RE}$=4, and k=2, where $N_{UCI}$ indicates a number of pieces of UCI carried on the PUSCH resource, $N_{RE}$ indicates a number of REs required to carry one piece of UCI, and k indicates a number of repetitions. $N_{UCI}$ UCI resources may be alternately mapped to $N_{total}$ REs in the order of indexes. The $n^{th}$ UCI resource is mapped to the $(b*N_{UCI}+n)^{th}$ RE in the $N_{total}$ REs, where b=0, 1, 2, ..., and $k*N_{RE}-1$. The UCI carried on the PUSCH resource is numbered in ascending order of indexes of at least one preamble associated with the UCI, and the $N_{total}$ REs are numbered first in frequency domain and then in time domain Each piece of UCI may be repeatedly sent twice on the PUSCH resource.

Figure 9:
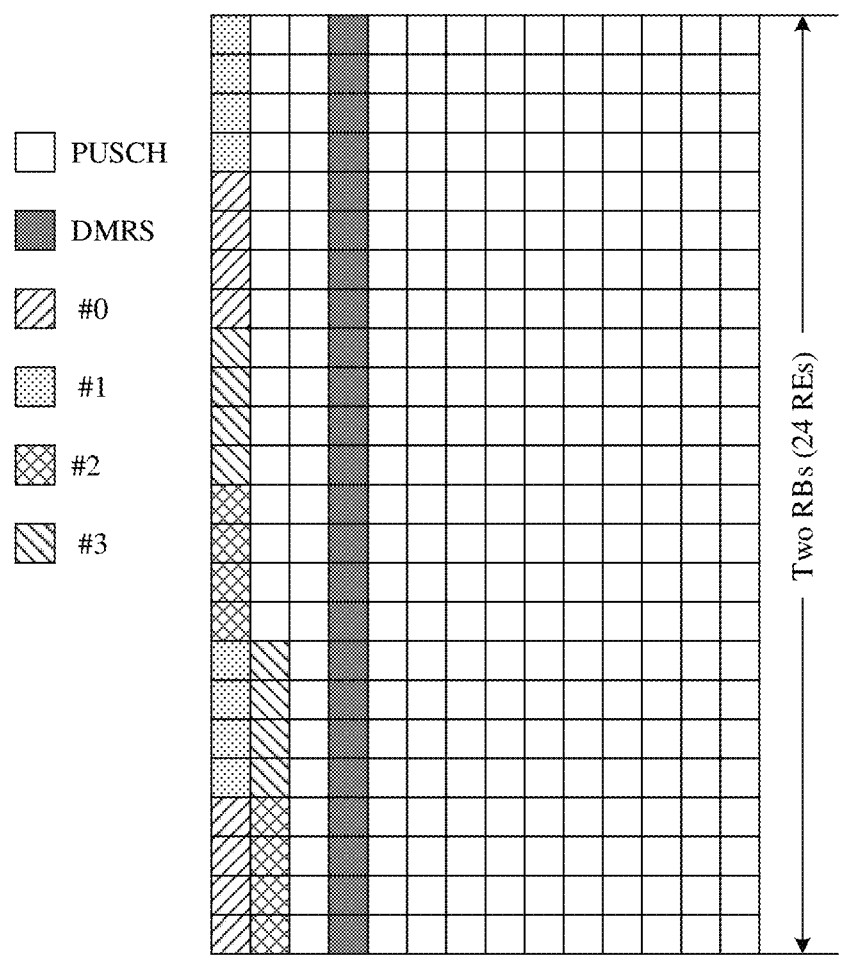
FIG. 9 is a schematic diagram of a resource set carrying UCI according to a further embodiment.
Figure 10:
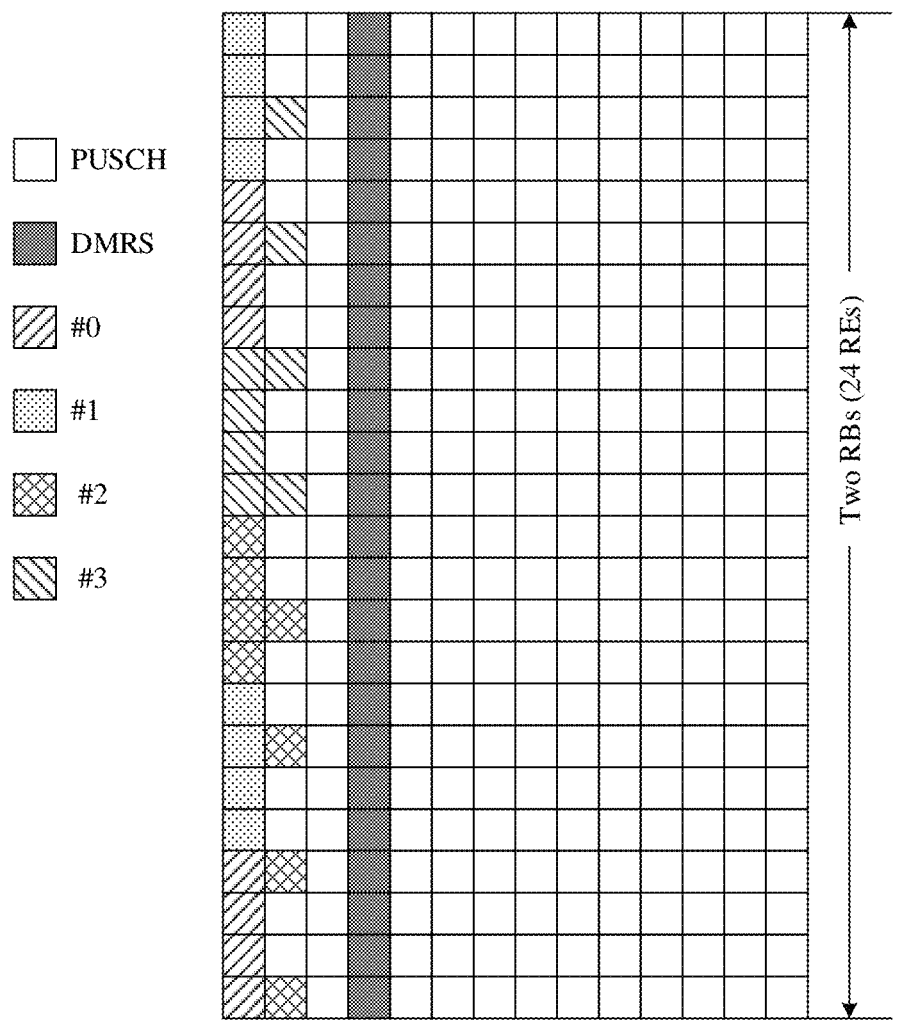
FIG. 10 is a schematic diagram of a resource set carrying UCI according to a still further embodiment.

In an example, as shown in FIG. 9 and FIG. 10, alternate mapping may be performed in a form of one transmission of each piece of UCI. The $n^{th}$ UCI resource is mapped to an RE whose index is $c*N_{UCI}*N_{RE}+n*N_{RE}+a$ in the $N_{total}$ REs, where $a=1, 2, \ldots$, and $N_{RE}-1$, and $C=0, 1, 2, \ldots$, and $k-1$. FIG. 9 shows alternate consecutive mapping in a form of one transmission of each piece of UCI, and FIG. 10 shows alternate inconsecutive mapping in a form of one transmission of each piece of UCI.

The plurality of pieces of UCI shown in FIG. 9 and FIG. 10 may be retransmitted on the PUSCH resource. In FIG. 9 and FIG. 10, a number of repetitions of each piece of UCI in the plurality of pieces of UCI is the same. In a possible implementation, the quantities of times of repeated transmission of the plurality pieces of UCI may alternatively be different.

In an example, a number of repetitions of UCI on the PUSCH resource may be associated with a preamble or a DMRS port. For example, preambles or DMRS ports may be grouped, and groups of preambles or DMRS ports may be corresponding to different quantities of repetitions of the UCI.

Figure 11:
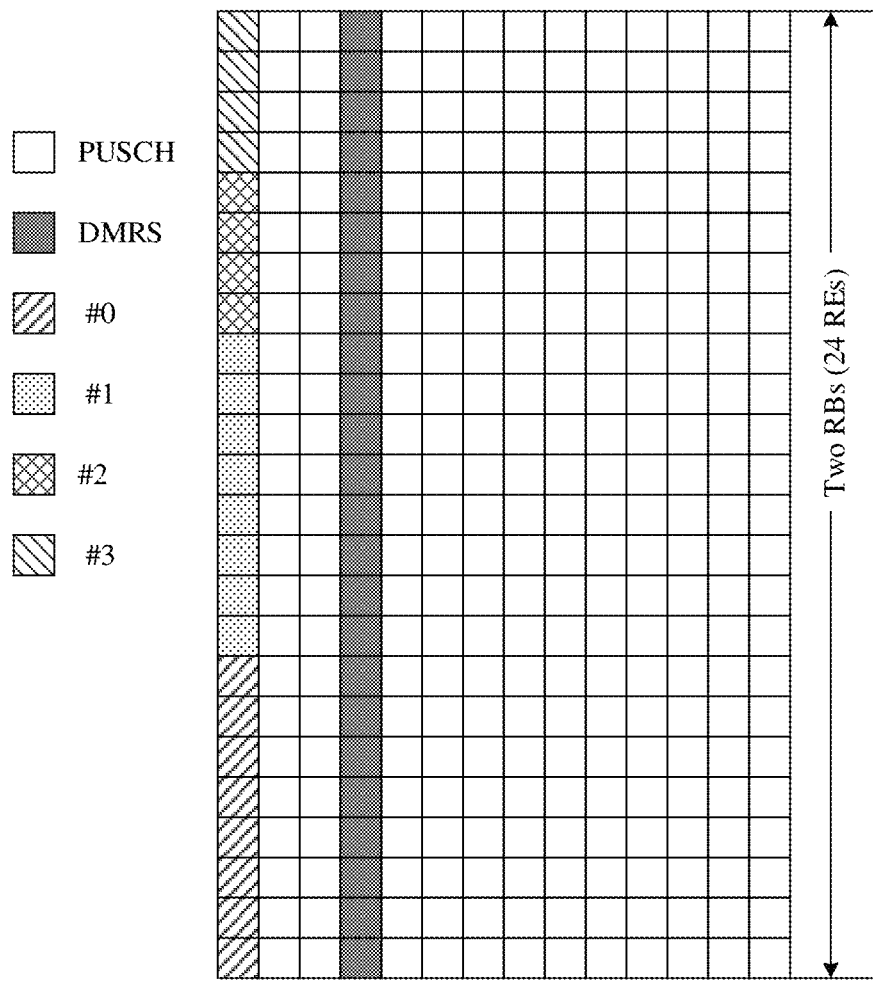
FIG. 11 is a schematic diagram of a resource set carrying UCI according to a yet further embodiment.
Figure 12:
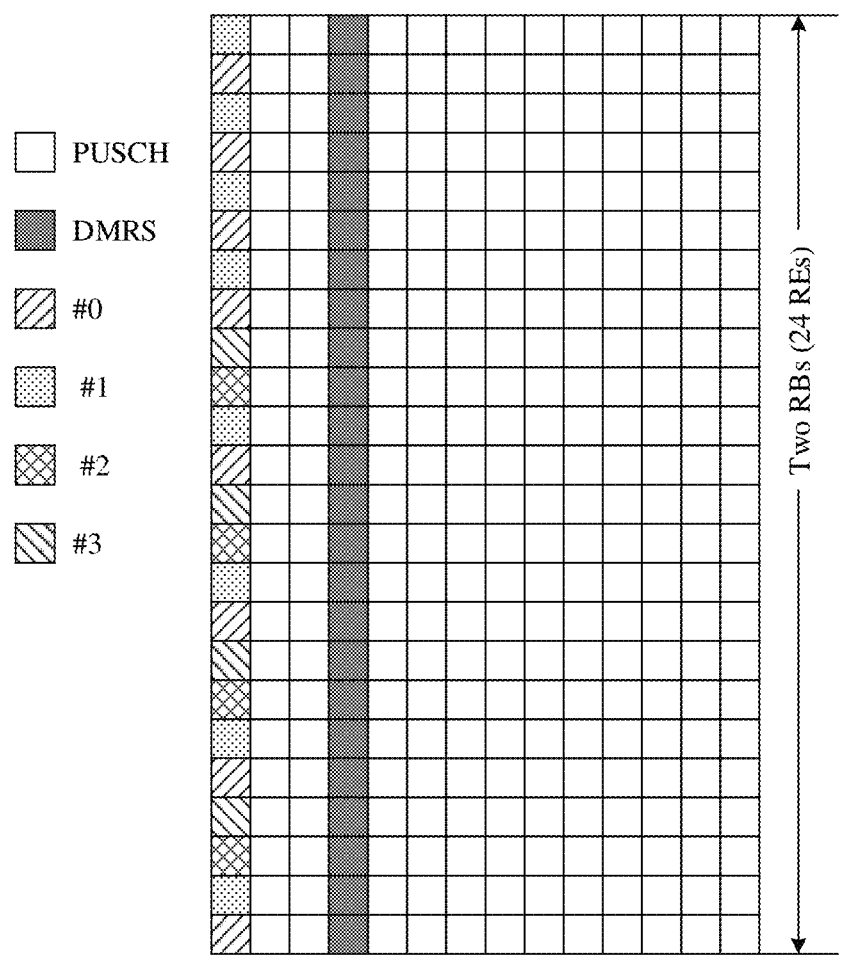
FIG. 12 is a schematic diagram of a resource set carrying UCI according to a still yet further embodiment.
Figure 13:
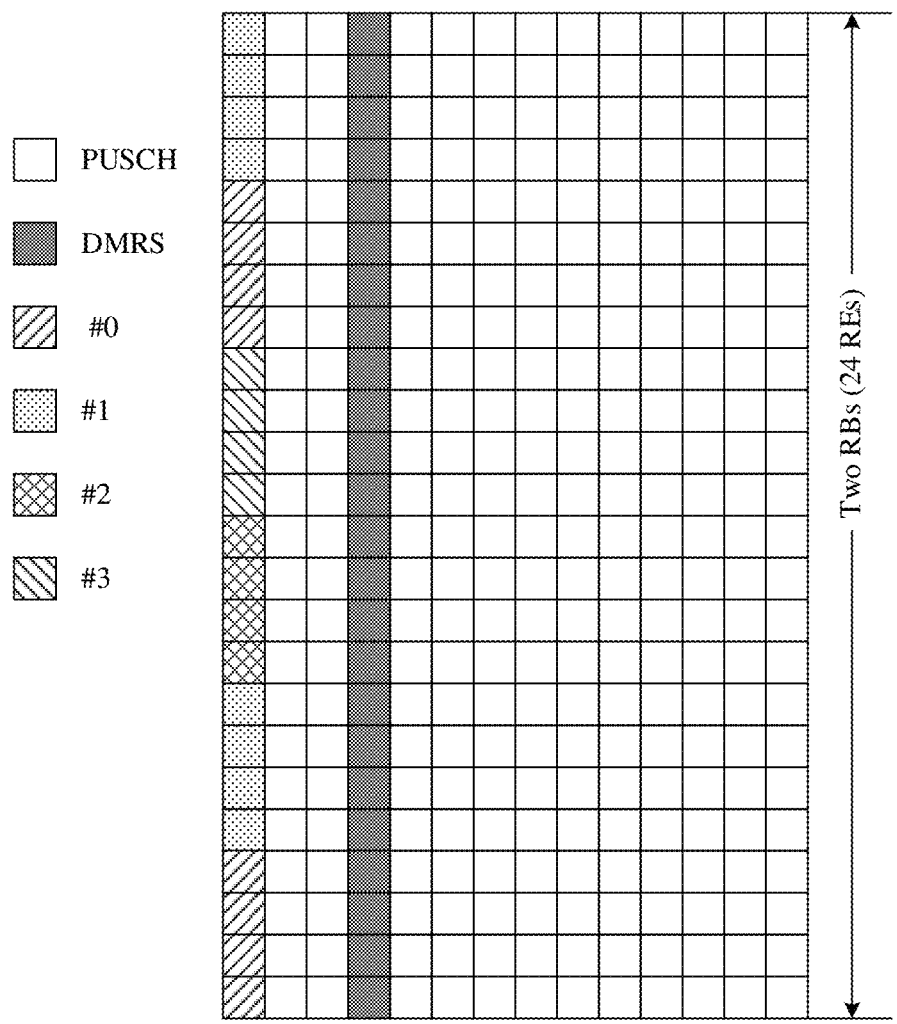
FIG. 13 is a schematic diagram of a resource set carrying UCI according to an even yet further embodiment.

For example, as shown in FIG. 11, bandwidth of the PUSCH resource=2 RBs, $N_{UCI}=4$, $N_{RE}=4$, $k_1=2$, $k_2=2$, $k_3=1$, and $k_4=1$. In FIG. 11, a plurality of pieces of UCI are consecutively mapped in an order of indexes. That is, the plurality of pieces of UCI may be repeatedly transmitted on the PUSCH resource. For example, the first piece of UCI (with an index #0) is repeatedly transmitted twice, and is carried on eight REs; the second piece of UCI (with an index #1) is repeatedly transmitted twice, and is carried on eight REs; the third piece of UCI (with an index #2) is transmitted once, and is carried on four REs; and UCI with an index #3 is transmitted once, and is carried on eight REs For example, as shown in FIG. 12, bandwidth of the PUSCH resource=2 RBs, $N_{UCI}=4$, $N_{RE}=4$, $k_1=2$, $k_2=2$, $k_3=1$, and $k_4=1$. In FIG. 12, a plurality of pieces of UCI are alternately mapped in an order of indexes. That is, the plurality of pieces of UCI may be repeatedly transmitted on the PUSCH resource. For example, the first piece of UCI (with an index #0) is repeatedly transmitted twice, and is carried on eight REs; the second piece of UCI (with an index #1) is repeatedly transmitted twice, and is carried on eight REs; the third piece of UCI (with an index #2) is transmitted once, and is carried on four REs; and the fourth piece of UCI (with an index #3) is transmitted once, and is carried on eight REs For example, as shown in FIG. 13, bandwidth of the PUSCH resource=2 RBs, $N_{UCI}=4$, $N_{RE}=4$, $k_1=2$, $k_2=2$, $k_3=1$, and $k_4=1$. In FIG. 13, alternate mapping may be performed in a form of each repetition of each piece of UCI.

Optionally, in a possible implementation, the first resource set includes a plurality of resource subsets used to repeatedly transmit the uplink control information, and each resource subset is used to repeatedly transmit the uplink control information once.

Optionally, at least two resource subsets in the plurality of resource subsets are located in different frequency bands.

That is, the number of repetitions of the UCI may have an association relationship with the bandwidth of the PUSCH resource.

For example, when the UCI is repeatedly transmitted for a plurality of times, a preset frequency domain resource may be used as a repetition unit. The preset frequency domain resource may be configured by the access network device, or the preset frequency domain resource may be agreed upon in advance.

Figure 14:
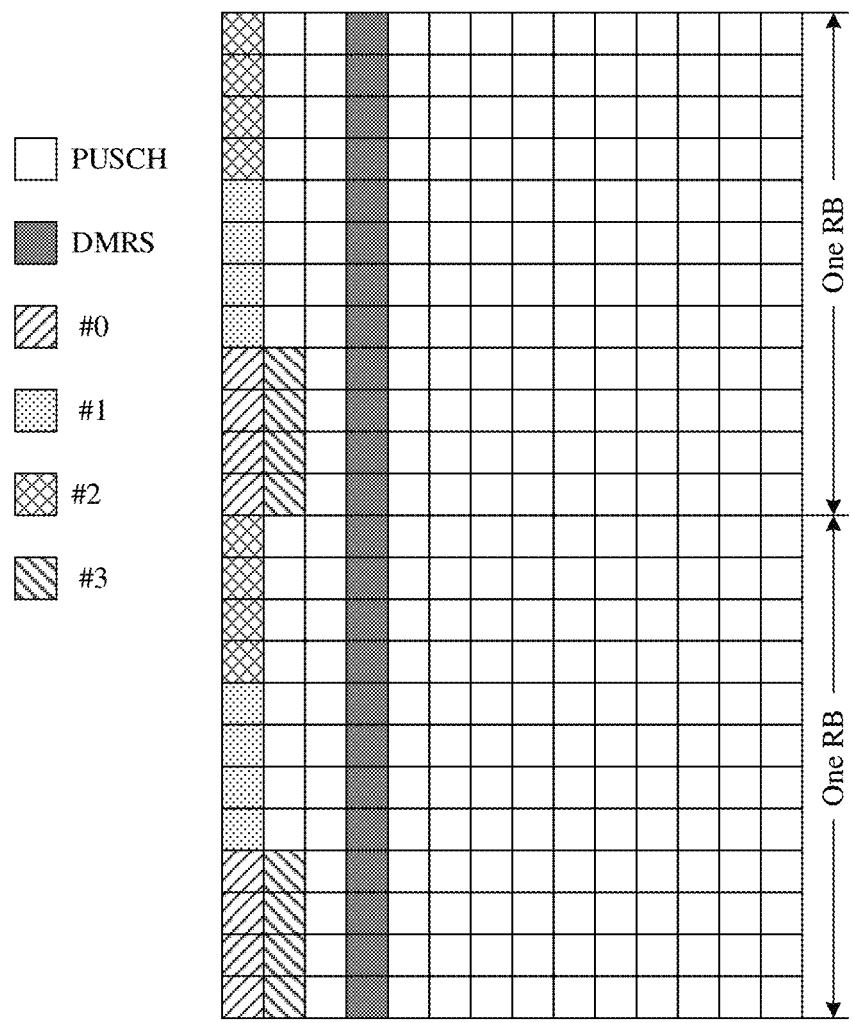
FIG. 14 is a schematic diagram of a resource set carrying UCI according to an even still yet further embodiment.

For example, as shown in FIG. 14, bandwidth of the PUSCH resource=2 RBs, $N_{UCI}=4$, $N_{RE}=4$, and $N_b=1$, where $N_b=1$ indicates that a repetition unit of the UCI on the PUSCH resource is a resource whose bandwidth is 1 RB. A mapping manner of the UCI on the PUSCH resource in a plurality of times of repeated transmission may be shown in FIG. 14. Repeated transmission is performed on the PUSCH at a granularity of one RB.

It should be understood that, the examples in FIG. 10 to FIG. 14 indicate that the UCI may be repeatedly transmitted on the PUSCH resource for a plurality of times, and the quantities of repetitions of the plurality of pieces of UCI carried on the PUSCH resource may be the same or different. A mapping rule of the plurality of pieces of UCI transmitted once on the PUSCH resource may be based on any one of the mapping rules in FIG. 5 to FIG. 7. This is not limited in the embodiments.

In this embodiment, preambles or DMRS ports associated with the PUSCH resource may be grouped into a plurality of groups, and UCI corresponding to the groups may have different quantities of repetitions, so that flexibility of transmitting the UCI on the PUSCH resource is improved, and a success rate of UCI demodulation is increased.

In an example, a plurality of terminal devices may send data on a first data resource set, where the first data resource set is a resource that is in the PUSCH resource and that is other than the plurality of resource sets and a resource set carrying a DMRS. That is, resources for sending the data by the plurality of terminal devices on the PUSCH resource may be the same.

In other words, when a plurality of preambles or DMRS ports are associated with a same PUSCH resource, sizes and locations of PUSCH resources required by data parts in uplink transmission corresponding to the preambles or DMRS ports may be the same.

In an example, the first terminal device sends first data on a second data resource set in the PUSCH resource, where the second data resource set is a resource set determined based on the first uplink control information and the first resource set used by the first terminal device to send the first uplink control information.

In other words, when a plurality of preambles or DMRS ports are associated with a same uplink transmission resource block, and the uplink transmission resource block includes a plurality of PUSCH resources, sizes and locations of PUSCH resources required in current uplink transmission corresponding to the plurality of preambles or DMRS ports may be different.

For example, UE may determine, based on conditions such as a load that needs to be transmitted and/or measured RSRP, a size and location of a PUSCH resource required by a data part in uplink transmission; and notify the access network device, by using indication information that is of a size and/or location of a PUSCH time-frequency resource and that is carried in the UCI and a location of a resource carrying UCI, of a size and location of a PUSCH resource used in current uplink transmission.

In an example, preambles may be in a one-to-one correspondence with locations of resources carrying UCI. The access network device may determine, by detecting a preamble, a location of a PUSCH time-frequency resource block corresponding to the preamble and a location of a resource that carries UCI and that is in the PUSCH time-frequency resource block; and then may determine, based on the resource location and indication information that is carried in the UCI and that is of a size and location of a PUSCH resource, a size and location of a PUSCH resource used for current uplink transmission. A relationship among the location of the resource carrying UCI, the indication information that is carried in the UCI and that is of the size and location of the PUSCH resource, and the size and location of the PUSCH resource used for current uplink transmission may be predefined. "Predefinition" may be implemented in a manner in which corresponding code, a table, or other related indication information may be pre-stored in a device (for example, including the terminal device and the network device). A specific implementation of "predefinition" is not limited in the embodiments.

For example, the size and location of the PUSCH resource used for current transmission may be determined in a predefined manner shown in Table 1.

TABLE 1

| Size and location of the PUSCH resource used for current transmission | RB index of the location of the resource carrying UCI in the PUSCH resource block | | | |
|---|---|---|---|---|
| Indication information that is included in the UCI and that is of the size and location of the PUSCH resource | 0 | 1 | 2 | 3 |
| 0 | 0 | 1 | 2 | 3 |
| 1 | 0 and 1 | | 2 and 3 | |
| 2 | | 0 to 3 | | |

For example, it is assumed that indication information included in UCI is 1, and an RB index corresponding to a resource that carries the UCI and that is in the PUSCH resource is 1. In this case, a corresponding PUSCH resource used for current uplink transmission is an RB 0 and an RB 1 in the PUSCH resource, and a resource that is used to carry data and that is in the PUSCH resource is a resource that is in resources whose indexes are RB 0 and RB 1 in the PUSCH resource and that is other than a resource carrying the UCI and a resource carrying a DMRS.

Figure 15:
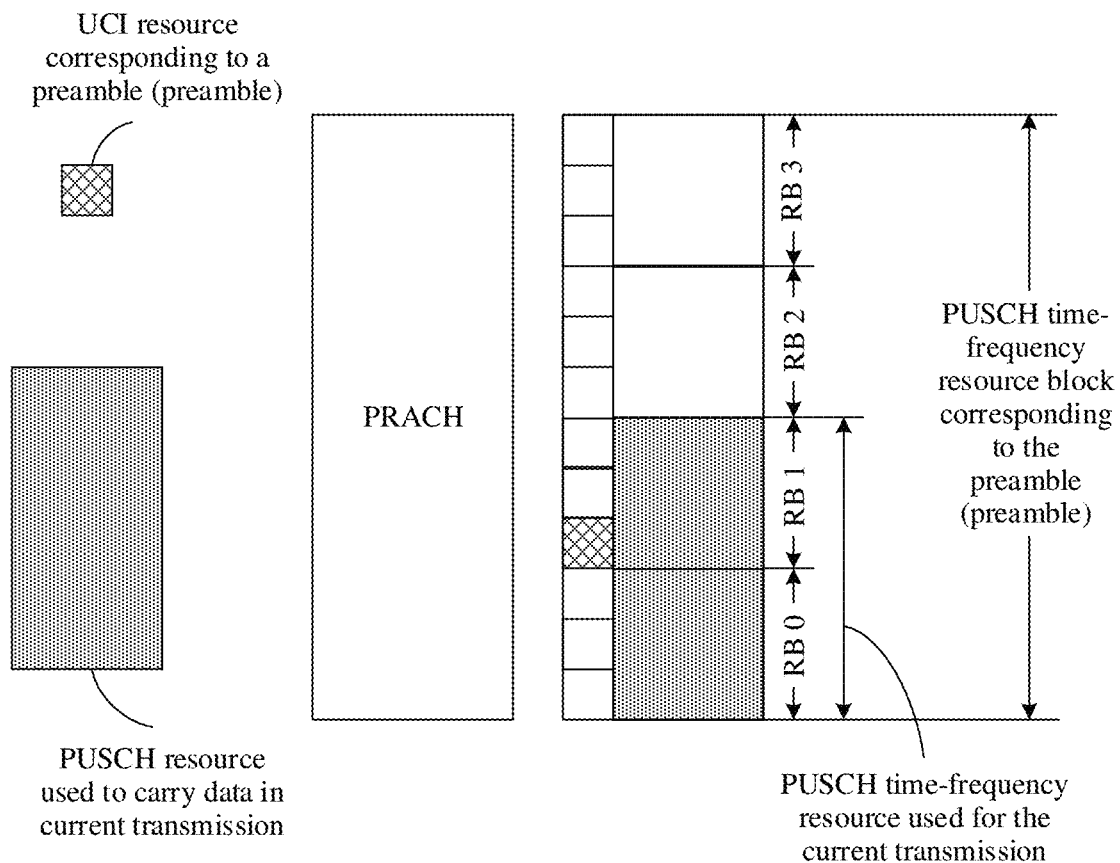
FIG. 15 is a schematic diagram of a size and a location of a PUSCH resource for current transmission according to an embodiment.

For example, as shown in FIG. 15, PUSCH resources of RB 0 to RB 3 may be determined based on a preamble, and it may be determined, based on the preamble, a resource used to transmit UCI is located in an RB 1. It may be determined, based on indication information that is included in the UCI and that is of a size and location of a PUSCH resource and an RB index of a location of a resource that carries the UCI and that is in the PUSCH resource, that PUSCH resources for current transmission are resources on the RB 0 and RB 1, where the UCI may be carried on a resource on the RB 1 shown in FIG. 15, and uplink data may be carried on a resource that is in the resources on the RB 0 and the RB 1 and that is other than the resource carrying the UCI and a resource carrying a DMRS. In this embodiment, a size and location of a resource that carries data and that is in the PUSCH resource may be flexibly selected. The size and location of the resource that carries the data and that is in the PUSCH resource may be determined by using a location of a resource carrying UCI and indication information that is carried in the UCI and that is of a size and location of the PUSCH resource.

In an example, different UCI resources on a same PUSCH resource may use a same time-frequency resource, namely, a same RE, which is represented by using $N_{RE}$. For example, the access network device needs to reserve only $N_{RE}$ REs on the PUSCH resource to map UCI. A mapping method for these REs may be based on any one of the mapping rules in FIG. 5 to FIG. 7. This is not limited in the embodiments. $N_{UCI}$ pieces of UCI on the PUSCH resource may all be mapped to a same RE, and may be distinguished by using different code domain resources. For example, different UCI use different code domain cyclic shifts, different orthogonal cover codes, or different spreading sequences, and the code domain resource is associated with a preamble or DMRS port. As long as the terminal device determines an index of a preamble that needs to be sent or a number of a DMRS port that needs to be sent, a code domain resource of UCI on a PUSCH resource corresponding to the preamble or DMRS port may be determined.

It should be noted that the foregoing examples in which resources that carry the UCI and the data and that are in the PUSCH resource are determined is merely intended to help a person of ordinary skill in the art understand the embodiments, instead of limiting the embodiments to a specific value or a specific scenario shown in the examples. It is clear that a person of ordinary skill in the art can make various equivalent modifications or changes based on the examples provided in the embodiments, and such modifications and changes also fall within the scope of the embodiments.

It should be understood that, sequence numbers of the foregoing processes do not mean execution sequences. The execution sequences of the processes should be determined based on functions and internal logic of the processes and should not be construed as any limitation on the implementation processes of the embodiments.

The uplink control information transmission method according to the embodiments is described in detail above. In the embodiments, resource sets that are used to send UCI and that are in a PUSCH resource shared by a plurality of terminal devices may be determined by using a preamble or a DMRS port, and an intersection set between any two resource sets in the plurality of resource sets is an empty set. That is, the resource sets used by the plurality of terminal devices to transmit the UCI are orthogonal, so that time-frequency resource collision that occurs when different terminal devices transmit the UCI is avoided, thereby increasing a success rate of UCI demodulation. It should be understood that the terminal device and the access network device in the embodiments may perform the methods in the foregoing embodiments. Therefore, for specific working processes of the following products, refer to corresponding processes in the foregoing method embodiments.

The following describes in detail an uplink control information transmission apparatus in the embodiments with reference to FIG. 16 to FIG. 19.

Figure 16:
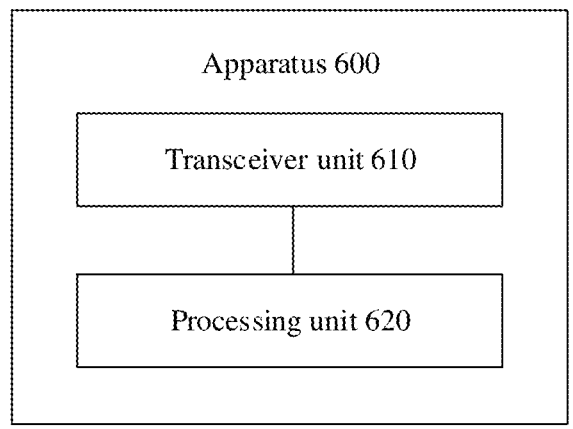
FIG. 16 is a schematic structural diagram of an uplink control information transmission apparatus according to an embodiment.

FIG. 16 is a schematic block diagram of an uplink control information transmission apparatus according to an embodiment.

It should be understood that the apparatus 600 may be corresponding to the access network device in the foregoing method embodiments, for example, may be a terminal device or a chip disposed in the terminal device. The apparatus 600 can perform all steps performed by the terminal device in FIG. 3. The apparatus 600 includes a transceiver unit 610 and a processing unit 620.

The processing unit 620 is configured to: determine a preamble that needs to be sent by the terminal device; and determine, based on the preamble, a first resource set that is in a PUSCH resource and that is used to send uplink control information, where the PUSCH resource includes a plurality of resource sets, the plurality of resource sets include the first resource set, an intersection set of any two resource sets in the plurality of resource sets is an empty set, each resource set is corresponding to one preamble set, and an intersection set of preamble sets corresponding to any two resource sets is an empty set. The transceiver unit 610 is configured to send the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

Optionally, in an embodiment, the processing unit 620 is configured to determine the first resource set based on an index of the preamble.

Optionally, in an embodiment, the transceiver unit 610 is further configured to receive configuration information from an access network device, where the configuration information includes at least one of the following information: information used to determine a number of resource sets included in the physical uplink shared channel resource, and information used to determine a resource size required by each resource set.

Optionally, in an embodiment, resources that are occupied by the plurality of resource sets and that are in the PUSCH resource may be consecutive in frequency domain.

Optionally, in an embodiment, resources that are occupied by the plurality of resource sets and that are in the PUSCH resource may be inconsecutive in frequency domain.

Optionally, in an embodiment, there is a time-domain guard period and/or a frequency-domain guard band between any two resource sets in the plurality of resource sets.

Optionally, in an embodiment, there is a time-domain guard period and/or a frequency-domain guard band between an RE in any resource set in the plurality of resource sets and an RE that is in the PUSCH resource and that is used to carry the uplink data.

Optionally, in an embodiment, the configuration information further includes a number of repetitions of the uplink control information.

Optionally, in an embodiment, a size of the first resource set is related to the number of repetitions of the uplink control information.

Optionally, in an embodiment, the first resource set includes a plurality of resource subsets used to repeatedly transmit the uplink control information, and each resource subset is used to repeatedly transmit the uplink control information once.

Optionally, in an embodiment, at least two resource subsets in the plurality of resource subsets are located in different frequency bands.

Optionally, in an embodiment, the uplink control information includes at least one of the following:

a modulation and coding scheme, a number of repetitions, a new data indicator, a HARQ process, a redundancy version, indication information of a PUSCH resource, a scrambling ID, and a reference signal configuration.

The modulation and coding scheme is used to indicate a modulation and coding scheme corresponding to the uplink data corresponding to the uplink control information. The number of repetitions is used to indicate a number of times of retransmission of the data and/or the preamble during one transmission. The new data indicator is used to indicate first transmission of new data or indicate retransmission of the data. The HARQ process is used to indicate an index of a HARQ process that is in at least one HARQ process and in which the data is transmitted. The redundancy version is used to indicate a redundancy version that is in at least one redundancy version and that is used for transmitting the data. The indication information of the PUSCH resource is used to indicate a size and/or location information of a PUSCH resource used for current transmission. The scrambling ID is used to indicate a scrambling ID for transmission of the data and/or a scrambling ID of a DMRS associated with a PUSCH carrying the data. The reference signal configuration is used to indicate configuration information for transmission of a reference signal corresponding to an uplink reference signal, and the reference signal includes a channel SRS and a DMRS associated with the PUSCH carrying the data.

It should be understood that the apparatus 600 herein is presented in a form of a functional unit. The term "unit" herein may be implemented in a form of software and/or hardware. This is not limited in the embodiments.

For example, "unit" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) and a memory that are configured to execute one or more software or firmware programs, a merged logic circuit, and/or another suitable component that supports the described functions. Therefore, the units in the examples described in the embodiments can be implemented by electronic hardware or a combination of computer software and electronic hardware.

Figure 17:
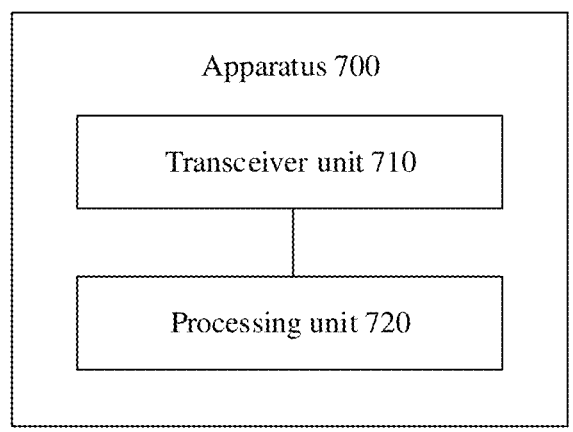
FIG. 17 is another schematic structural diagram of an uplink control information transmission apparatus according to an embodiment.

FIG. 17 is a schematic block diagram of an uplink control information transmission apparatus according to an embodiment.

It should be understood that the apparatus 700 may be corresponding to the access network device in the foregoing method embodiments, for example, may be an access network device or a chip disposed in the access network device. The apparatus 700 can perform all steps performed by the access network device in FIG. 3. The apparatus 700 includes a transceiver unit 710 and a processing unit 720.

The transceiver unit 710 is configured to: receive a preamble sent by a terminal device. The processing unit 720 is configured to determine, based on the preamble, a first resource set that is in a PUSCH resource and that is used to receive uplink control information, where the PUSCH resource includes a plurality of resource sets, the plurality of resource sets include the first resource set, an intersection set of any two resource sets in the plurality of resource sets is an empty set, each resource set is corresponding to one preamble set, and an intersection set of preamble sets corresponding to any two resource sets is an empty set. The transceiver unit 710 is further configured to receive the uplink control information and uplink data on the PUSCH resource, where the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

Optionally, in an embodiment, the processing unit 720 is configured to determine the first resource set based on an index of the preamble.

Optionally, in an embodiment, the transceiver unit 710 is further configured to send configuration information to the terminal device, where the configuration information includes at least one of the following information: information used to determine a number of resource sets included in the physical uplink shared channel resource, and information used to determine a resource size required by each resource set.

Optionally, in an embodiment, resources that are occupied by the plurality of resource sets and that are in the PUSCH resource may be consecutive in frequency domain.

Optionally, in an embodiment, resources that are occupied by the plurality of resource sets and that are in the PUSCH resource may be inconsecutive in frequency domain.

Optionally, in an embodiment, there is a time-domain guard period and/or a frequency-domain guard band between any two resource sets in the plurality of resource sets.

Optionally, in an embodiment, there is a time-domain guard period and/or a frequency-domain guard band between an RE in any resource set in the plurality of resource sets and an RE that is in the PUSCH resource and that is used to carry the uplink data.

Optionally, in an embodiment, the configuration information further includes a number of repetitions of the uplink control information.

Optionally, in an embodiment, a size of the first resource set is related to the number of repetitions of the uplink control information.

Optionally, in an embodiment, the first resource set includes a plurality of resource subsets used to repeatedly transmit the uplink control information, and each resource subset is used to repeatedly transmit the uplink control information once.

Optionally, in an embodiment, at least two resource subsets in the plurality of resource subsets are located in different frequency bands.

Optionally, in an embodiment, the uplink control information includes at least one of the following:

a modulation and coding scheme, a number of repetitions, a new data indicator, a HARQ process, a redundancy version, indication information of a PUSCH resource, a scrambling ID, and a reference signal configuration.

The modulation and coding scheme is used to indicate a modulation and coding scheme corresponding to the uplink data corresponding to the uplink control information. The number of repetitions is used to indicate a number of times of retransmission of the data and/or the preamble during one transmission. The new data indicator is used to indicate first transmission of new data or indicate retransmission of the data. The HARQ process is used to indicate an index of a HARQ process that is in at least one HARQ process and in which the data is transmitted. The redundancy version is used to indicate a redundancy version that is in at least one redundancy version and that is used for transmitting the data. The indication information of the PUSCH resource is used to indicate a size and/or location information of a PUSCH resource used for current transmission. The scrambling ID is used to indicate a scrambling ID for transmission of the data and/or a scrambling ID of a DMRS associated with a PUSCH carrying the data. The reference signal configuration is used to indicate configuration information for transmission of a reference signal corresponding to an uplink reference signal, and the reference signal includes a channel SRS and a DMRS associated with the PUSCH carrying the data.

It should be understood that the apparatus 700 herein is presented in a form of a functional unit. The term "unit" herein may be implemented in a form of software and/or hardware. This is not limited in the embodiments.

For example, "unit" may be a software program, a hardware circuit, or a combination thereof that implements the foregoing functions. The hardware circuit may include an ASIC, an electronic circuit, a processor (for example, a shared processor, a dedicated processor, or a group processor) and a memory that are configured to execute one or more software or firmware programs, a merged logic circuit, and/or another suitable component that supports the described functions. Therefore, the units in the examples described in the embodiments can be implemented by electronic hardware or a combination of computer software and electronic hardware.

Figure 18:
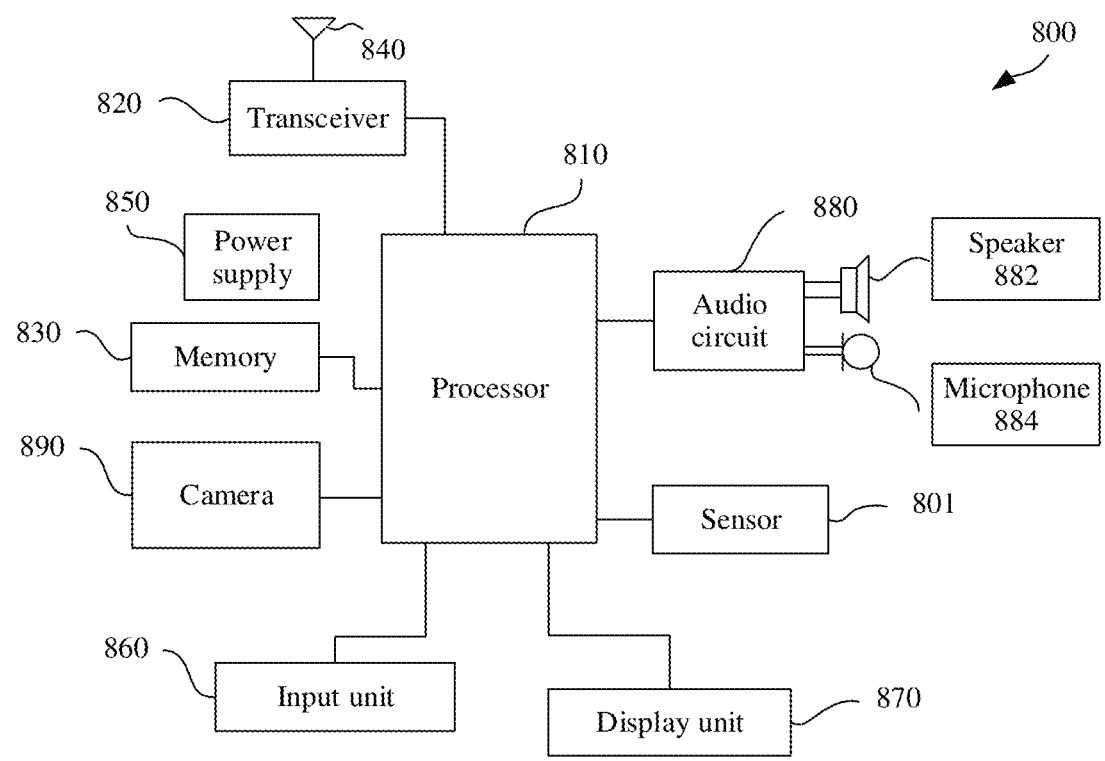
FIG. 18 is still another schematic structural diagram of an uplink control information transmission apparatus according to an embodiment.

FIG. 18 is a schematic structural diagram of an uplink control information transmission apparatus according to an embodiment. The apparatus 800 may be a terminal device, and is applied to the system shown in FIG. 1, to perform a function of the terminal device in the foregoing method embodiments.

As shown in the figure, the terminal device 800 includes a processor 810 and a transceiver 820.

Optionally, the terminal device 800 further includes a memory 830. The processor 810, the transceiver 802, and the memory 830 may communicate with each other through an internal connection path, and transfer a control signal and/or a data signal. The memory 2030 is configured to store a computer program. The processor 810 is configured to: invoke the computer program from the memory 830 and run the computer program, to control the transceiver 820 to receive/send a signal.

Optionally, the terminal device 800 may further include an antenna 840, configured to send, by using a radio signal, uplink data or uplink control signaling output by the transceiver 820.

The processor 810 and the memory 830 may be integrated into one processing apparatus. The processor 810 is configured to execute program code stored in the memory 830 to implement the foregoing functions. During specific implementation, the memory 830 may alternatively be integrated into the processor 810, or may be independent of the processor 810. The processor 810 may be corresponding to the processing unit 620 in FIG. 16.

The transceiver 820 may be corresponding to the transceiver unit 610 in FIG. 16, and may also be referred to as a communication unit. The transceiver 820 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that, the terminal device 800 shown in FIG. 18 can implement all processes of the terminal device in the method embodiment shown in FIG. 3. Operations and/or functions of the modules in the terminal device 800 are separately intended to implement corresponding procedures in the foregoing method embodiments. For details, refer to the descriptions in the foregoing method embodiments. To avoid repetition, detailed descriptions are properly omitted herein.

The processor 810 may be configured to perform an action internally implemented by the terminal device in the foregoing method embodiments, and the transceiver 820 may be configured to perform a sending action by the terminal device for the network device in the foregoing method embodiments or a receiving operation from the network device in the foregoing method embodiments. For details, refer to the descriptions in the foregoing method embodiments. Details are not described herein again.

Optionally, the terminal device 800 may further include a power supply 850, configured to supply power to various components or circuits in the terminal device.

In addition, to make functions of the terminal device more perfect, the terminal device 800 may further include one or more of an input unit 860, a display unit 870, an audio circuit 880, a camera 890, a sensor 801, and the like, and the audio circuit may further include a speaker 882, a microphone 884, and the like.

Figure 19:
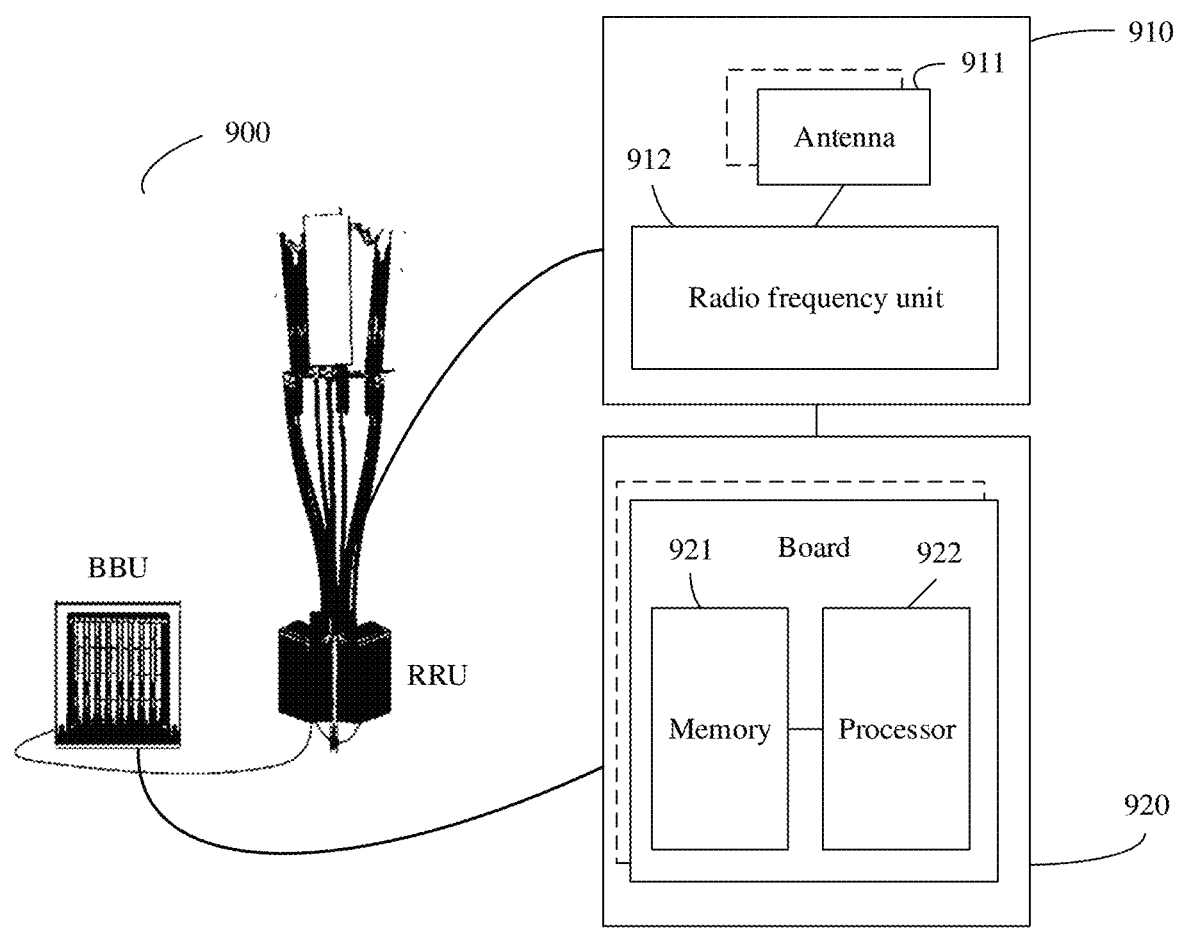
FIG. 19 is yet another schematic structural diagram of an uplink control information transmission apparatus according to an embodiment.

FIG. 19 is a schematic structural diagram of an uplink control information receiving apparatus according to an embodiment. For example, the apparatus 900 may be an access network device. The access network device 900 may be applied to the system shown in FIG. 1, and perform a function of the access network device in the method embodiments.

As shown in FIG. 19, the access network device 900 may include one or more radio frequency units such as a remote radio unit (RRU) 910 and one or more baseband units (BBU) (which may also be referred to as a digital unit, digital unit, DU) 920. The RRU 910 may be referred to as a communication unit, and be corresponding to the transceiver unit 710 in FIG. 17.

Optionally, the transceiver unit 910 may also be referred to as a transceiver machine, a transceiver circuit, a transceiver, or the like, and may include at least one antenna 911 and a radio frequency unit 912.

Optionally, the transceiver unit 9100 may include a receiving unit and a sending unit. The receiving unit may be corresponding to a receiver (or referred to as a receiver machine or a receiver circuit), and the sending unit may be corresponding to a transmitter (or referred to as a transmitter machine or a transmitter circuit). The RRU 910 is configured to: receive and send a radio frequency signal and perform conversion between the radio frequency signal and a baseband signal, for example, configured to send first information to a terminal device. The BBU 920 is configured to: perform baseband processing, control a network device, and the like. The RRU 910 and the BBU 920 may be physically disposed together, or may be physically separated, namely, a distributed base station.

The BBU 920 is a control center of the network device, or may be referred to as a processing unit. The BBU 920 may be corresponding to the processing unit 720 in FIG. 17 and is configured to implement a baseband processing function such as channel coding, multiplexing, modulation, or spreading. For example, the BBU (the processing unit) may be configured to control a base station to perform an operation procedure related to the network device in the foregoing method embodiments, for example, generating the foregoing indication information.

In an example, the BBU 920 may include one or more boards, and a plurality of boards may jointly support a radio access network (such as an LTE network) having a single access standard, or may separately support radio access networks (for example, an LTE network, a 5G network, or another network) having different access standards. The BBU 920 further includes a memory 921 and a processor 922. The memory 921 is configured to store necessary instructions and necessary data. The processor 922 is configured to control the network device to perform a necessary action, for example, configured to control the network device to perform an operation procedure related to the network device in the foregoing method embodiments. The memory 921 and the processor 922 may serve the one or more boards. In other words, the memory and the processor may be independently disposed on each board. Alternatively, the plurality of boards may share the same memory and the same processor. In addition, each board may be further provided with a necessary circuit.

It should be understood that the access network device 900 shown in FIG. 19 can implement processes of the access network device in the method embodiment in FIG. 3. Operations and/or functions of the modules in the access network device 900 are separately intended to implement corresponding procedures in the foregoing method embodiments. For details, refer to the descriptions in the foregoing method embodiments. To avoid repetition, detailed descriptions are properly omitted herein.

The BBU 920 may be configured to perform an action internally implemented by the access network device in the foregoing method embodiments, and the RRU 910 may be configured to perform a sending action by the access network device for the terminal device in the foregoing embodiments or a receiving action from the terminal device in the foregoing method embodiments. For details, refer to the descriptions in the foregoing method embodiments. Details are not described herein again.

An embodiment further provides a processing apparatus, including a processor and an interface. The processor is configured to perform the method in any one of the foregoing method embodiments.

It should be understood that the foregoing processing apparatus may be a chip. For example, the processing apparatus may be a field programmable gate array (FPGA), an ASIC, a system on chip (SoC), a central processing unit (CPU), a network processor (NP), a digital signal processing circuit (DSP), a micro controller unit (MCU), a programmable controller (PLD), or another integrated chip.

In an implementation process, the steps in the foregoing methods can be completed by using a hardware integrated logic circuit in the processor, or by using instructions in a form of software. The steps of the methods disclosed with reference to the embodiments may be directly performed and accomplished by using a hardware processor or may be performed and accomplished by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments may be an integrated circuit chip and has a signal processing capability. In an implementation process, the steps in the foregoing method embodiments can be completed by using a hardware integrated logic circuit in the processor, or by using instructions in a form of software. The foregoing processor may be a general purpose processor, a digital signal processor (DSP), an ASIC, a field programmable gate array (FPGA) or another programmable logic device, a discrete gate or a transistor logic device, or a discrete hardware component. The processor may implement or perform the methods, the steps, and logical block diagrams that are disclosed in the embodiments. The general-purpose processor may be a microprocessor, or the processor may be any conventional processor or the like. The steps of the methods disclosed with reference to the embodiments may be directly performed and accomplished by using a hardware decoding processor or may be performed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through examples rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in the embodiments include, but are not limited to, these memories and any memory of another proper type.

According to the method provided in the embodiments, the embodiments further provide a computer program product, and the computer program product includes computer program code. When the computer program code is run on a computer, the computer is enabled to perform the method in the embodiment shown in FIG. 3.

According to the method provided in the embodiments, the embodiments further provide a computer-readable medium, and the computer-readable medium stores program code. When the program code is run on a computer, the computer is enabled to perform the method in the embodiment shown in FIG. 3.

According to the method provided in the embodiments, the embodiments further provide a system. The system includes one or more terminal devices and one or more access network devices that are described above.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments are completely corresponding to the terminal device or network device in the method embodiments. A corresponding module or unit performs a corresponding step. For example, the communication unit (the transceiver) performs sending or receiving steps in the method embodiments, and the processing unit (the processor) performs another step other than the sending and receiving steps. For a function of a specific unit, refer to a corresponding method embodiment. There may be one or more processors.

A person of ordinary skill in the art may be aware that, various illustrative logical blocks and steps that are described with reference to the embodiments may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope.

It may be clearly understood by a person of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided in the embodiments, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments may be integrated into one processing unit, or each of the units may exist alone physically, or two or more units may be integrated into one unit.

In the foregoing embodiments, all or some of the functions of the functional units may be implemented by software, hardware, firmware, or any combination thereof. When being implemented by using the software, all or some of the functions may be implemented in a form of a computer program product. The computer program product includes one or more computer instructions (programs). When the computer program instructions (programs) are loaded and executed on a computer, the procedures or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the solutions essentially, or the part contributing to the current technology, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium may include: any medium that can store program code, such as a USB flash drive, a removable hard disk, a ROM, a RAM, a magnetic disk, or an optical disc.

The foregoing descriptions are merely specific implementations, and are non-limiting.

What is claimed is:

1. An uplink control information transmission method, comprising:
   determining, by a terminal device, a preamble that needs to be sent;
   determining, by the terminal device based on the preamble, a first resource set that is in a physical uplink shared channel (PUSCH) resource and that is used to send uplink control information, wherein the PUSCH resource comprises a plurality of resource sets, the plurality of resource sets comprise the first resource set, an intersection set of any two resource sets in the plurality of resource sets is an empty set, each resource set is corresponding to one preamble set, and an intersection set of preamble sets corresponding to any two resource sets is an empty set; and
   sending, by the terminal device, the uplink control information and uplink data on the PUSCH resource, wherein the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

2. The method according to claim 1, wherein the determining, by the terminal device based on the preamble, of a first resource set that is in a PUSCH resource and that is used to send uplink control information comprises:
   determining, by the terminal device, the first resource set based on an index of the preamble.

3. The method according to claim 1, further comprising:
   receiving configuration information from an access network device, wherein the configuration information comprises at least one of the following information: information used to determine a number of resource sets comprised in the PUSCH resource, and information used to determine a resource size required by each resource set.

4. The method according to claim 3, wherein the configuration information further comprises a number of repetitions of the uplink control information.

5. The method according to claim 4, wherein the first resource set comprises a plurality of resource subsets used to repeatedly transmit the uplink control information, and each resource subset is used to repeatedly transmit the uplink control information once.

6. The method according to claim 5, wherein at least two resource subsets in the plurality of resource subsets are located in different frequency bands.

7. The method according to claim 1, wherein there is a time-domain guard period and/or a frequency-domain guard band between any two resource sets in the plurality of resource sets.

8. The method according to claim 1, wherein there is a time-domain guard period and/or a frequency-domain guard band between a resource element in any resource set in the plurality of resource sets and a resource element that is in the PUSCH resource and that is used to carry the uplink data.

9. The method according to claim 1 wherein a size of the first resource set is related to the number of repetitions of the uplink control information.

10. An uplink control information transmission apparatus, comprising:
    a processing unit configured to determine a preamble that needs to be sent, and
    the processing unit is further configured to determine, based on the preamble, a first resource set that is in a physical uplink shared channel (PUSCH) resource and that is used to send uplink control information, wherein the PUSCH resource comprises a plurality of resource sets, the plurality of resource sets comprise the first resource set, an intersection set of any two resource sets in the plurality of resource sets is an empty set, each resource set is corresponding to one preamble set, and an intersection set of preamble sets corresponding to any two resource sets is an empty set; and
    a transceiver unit configured to send the uplink control information and uplink data on the PUSCH resource, wherein the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

11. The apparatus according to claim 10, wherein the processing unit is configured to:
    determine the first resource set based on an index of the preamble.

12. The apparatus according to claim 10, wherein the transceiver unit is further configured to:
    receive configuration information from an access network device, wherein the configuration information comprises at least one of the following information: information used to determine a number of resource sets comprised in the PUSCH resource, and information used to determine a resource size required by each resource set.

13. The apparatus according to claim 12, wherein the configuration information further comprises a number of repetitions of the uplink control information.

14. The apparatus according to claim 13, wherein the first resource set comprises a plurality of resource subsets used to repeatedly transmit the uplink control information, and each resource subset is used to repeatedly transmit the uplink control information once.

15. The apparatus according to claim 14, wherein at least two resource subsets in the plurality of resource subsets are located in different frequency bands.

16. The apparatus according to claim 10, wherein there is a time-domain guard period and/or a frequency-domain guard band between any two resource sets in the plurality of resource sets.

17. The apparatus according to claim 10, wherein there is a time-domain guard period and/or a frequency-domain guard band between a resource element in any resource set in the plurality of resource sets and a resource element that is in the PUSCH resource and that is used to carry the uplink data.

18. The apparatus according to claim 10, wherein a size of the first resource set is related to the number of repetitions of the uplink control information.

19. An uplink control information transmission apparatus, wherein the apparatus comprises a processor configured to: connect to a memory and execute instructions in the memory, to enable the apparatus to implement a method of:
determining a preamble that needs to be sent;
determining based on the preamble, a first resource set that is in a physical uplink shared channel (PUSCH) resource and that is used to send uplink control information, wherein the PUSCH resource comprises a plurality of resource sets, the plurality of resource sets comprise the first resource set, an intersection set of any two resource sets in the plurality of resource sets is an empty set, each resource set is corresponding to one preamble set, and an intersection set of preamble sets corresponding to any two resource sets is an empty set; and
sending the uplink control information and uplink data on the PUSCH resource, wherein the uplink control information is mapped to the first resource set, the uplink data is mapped to a resource that is other than the plurality of resource sets and that is in the PUSCH resource, and no information or uplink data is mapped to a resource set that is other than the first resource set and that is in the plurality of resource sets.

* * * * *